Aug. 21, 1956 W. B. SIMONS 2,759,224
APPARATUS FOR EXTRACTING FIBERS FROM FIBER-BEARING PLANTS
Filed June 21, 1950 12 Sheets-Sheet 9

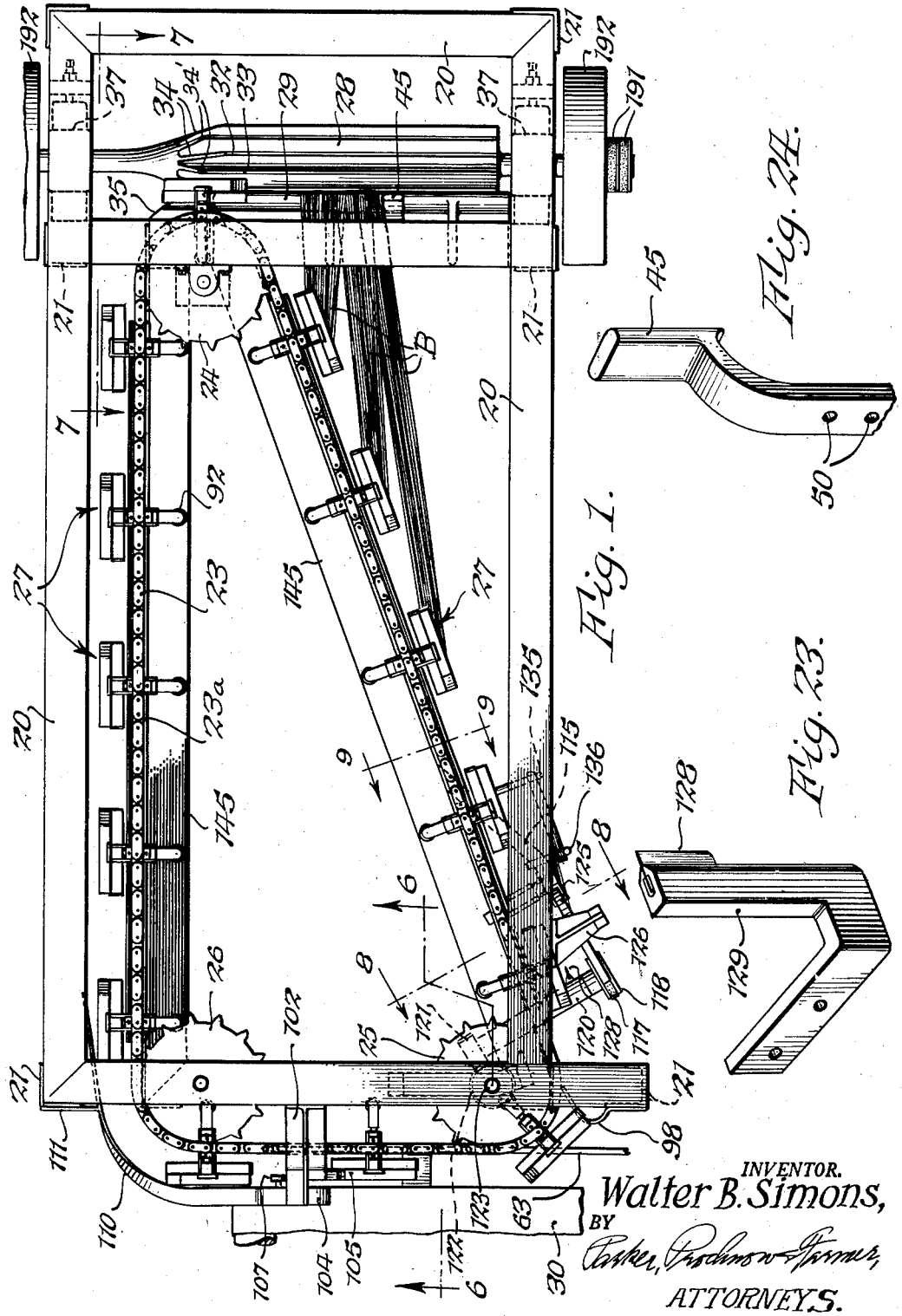

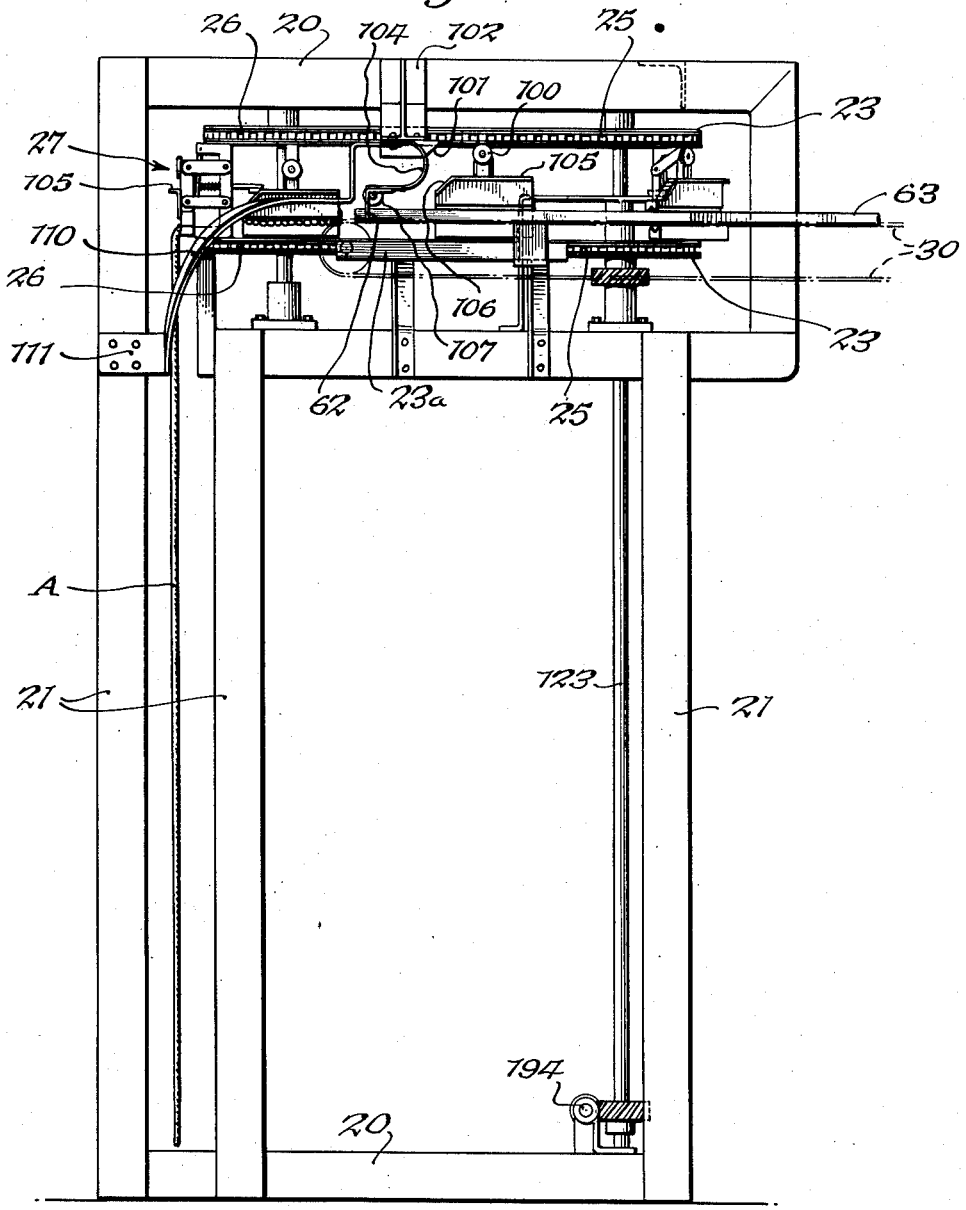

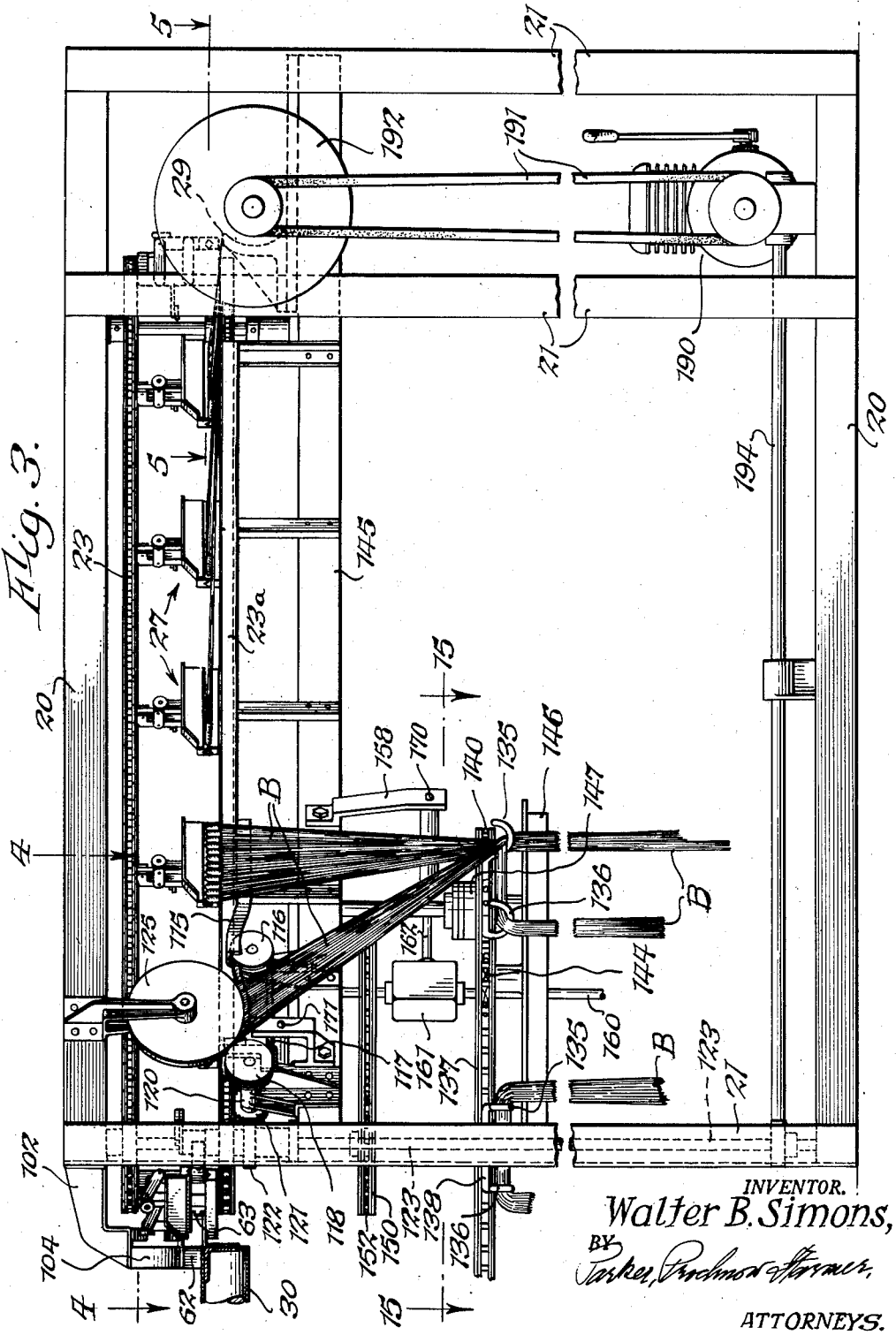

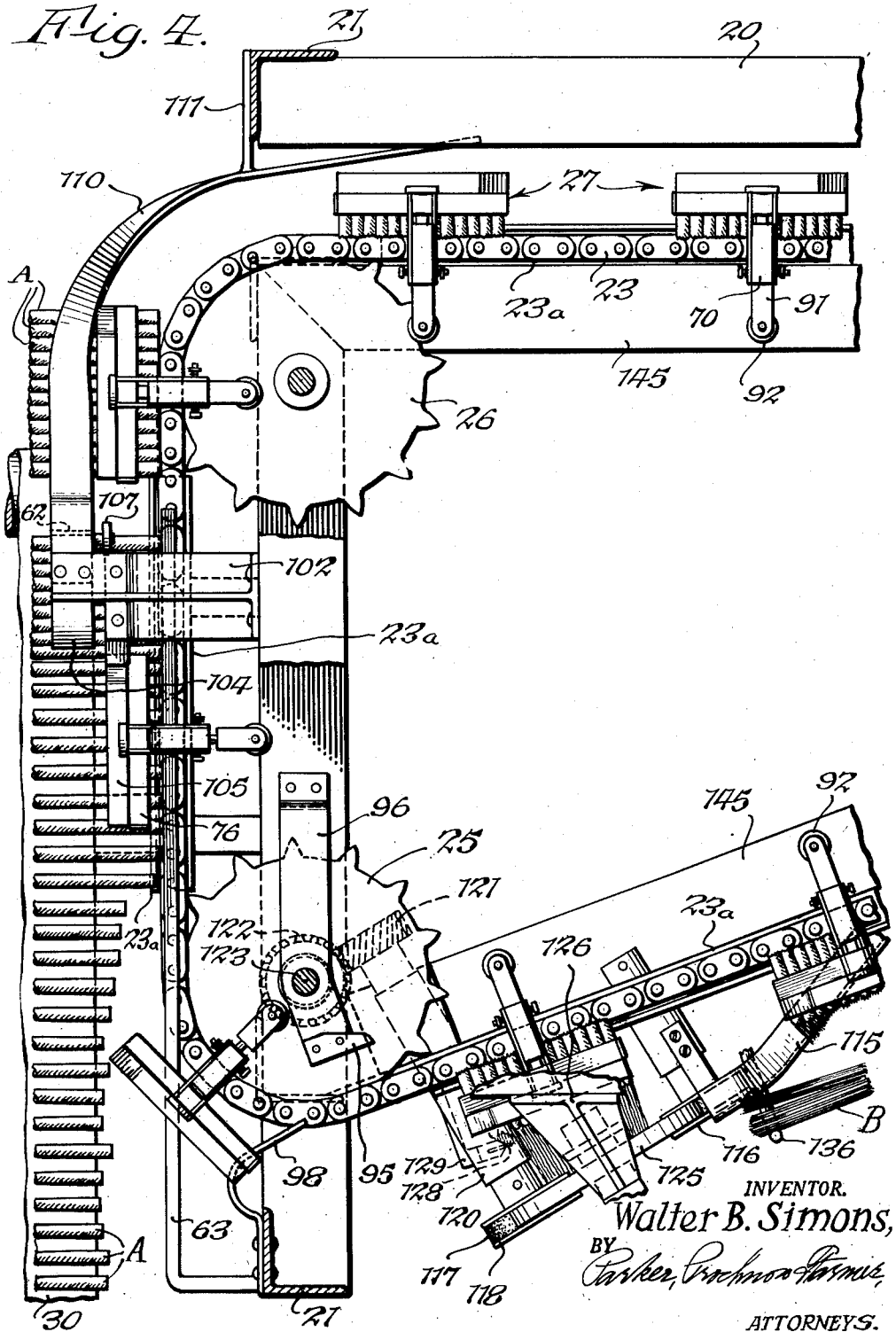

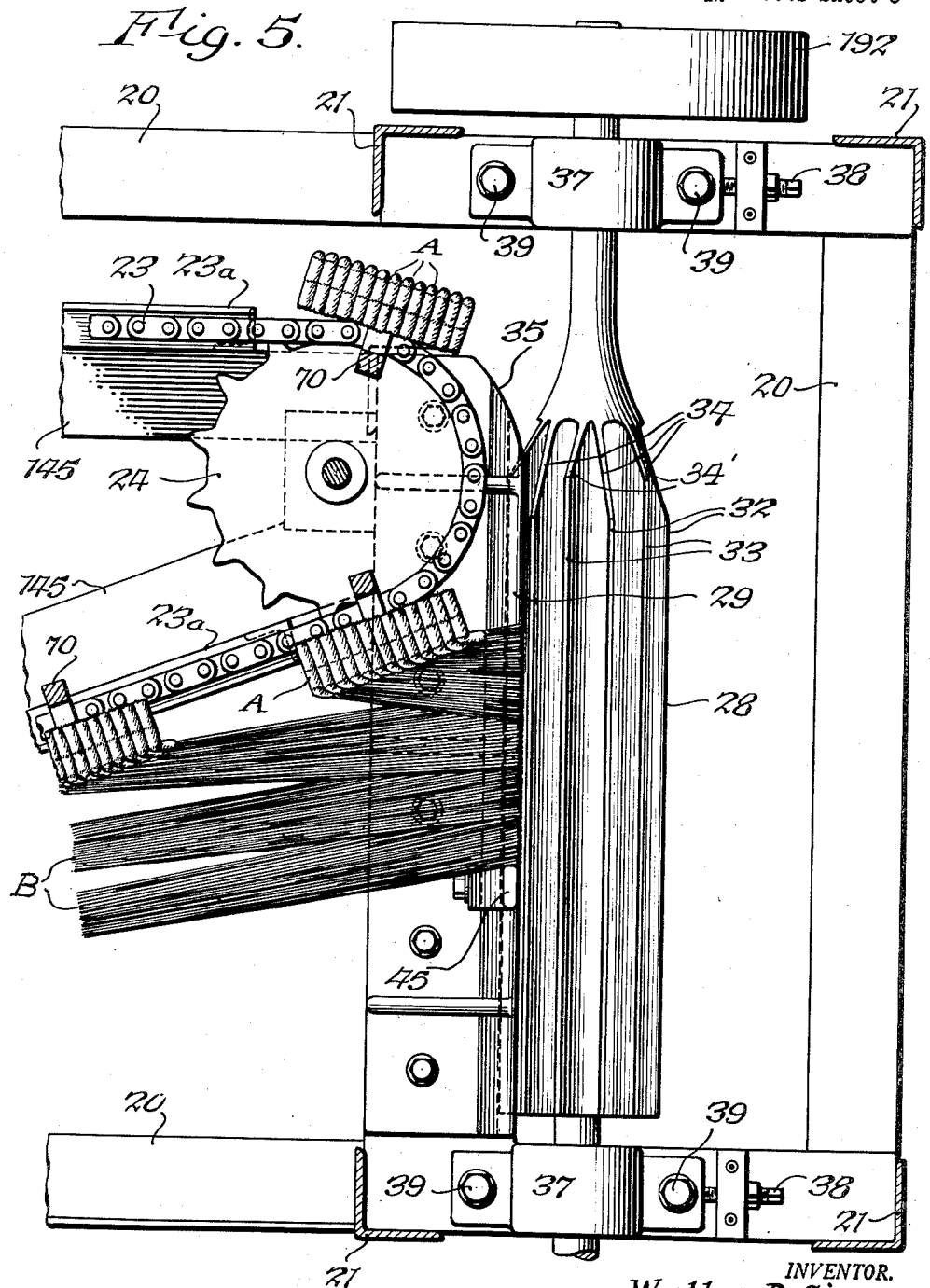

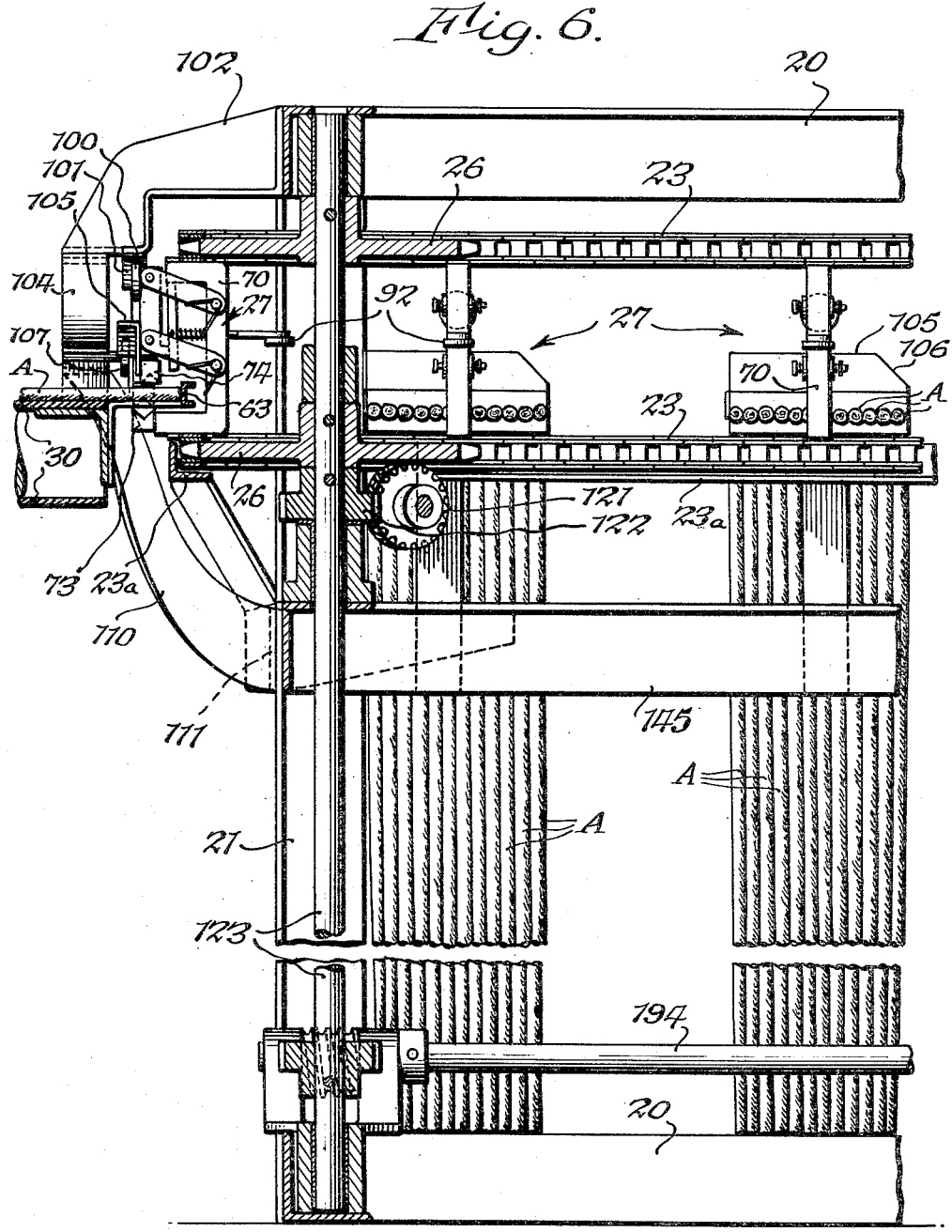

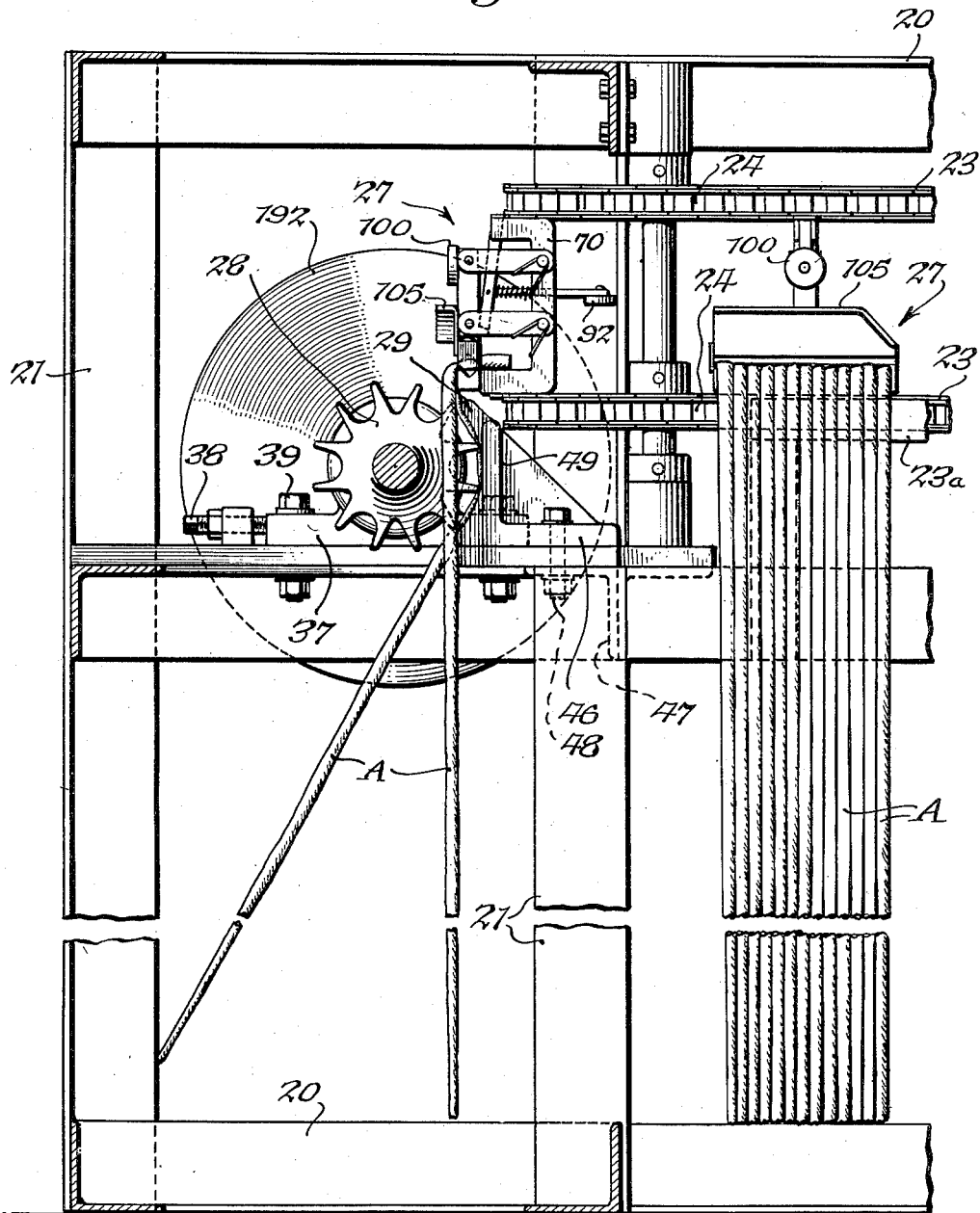

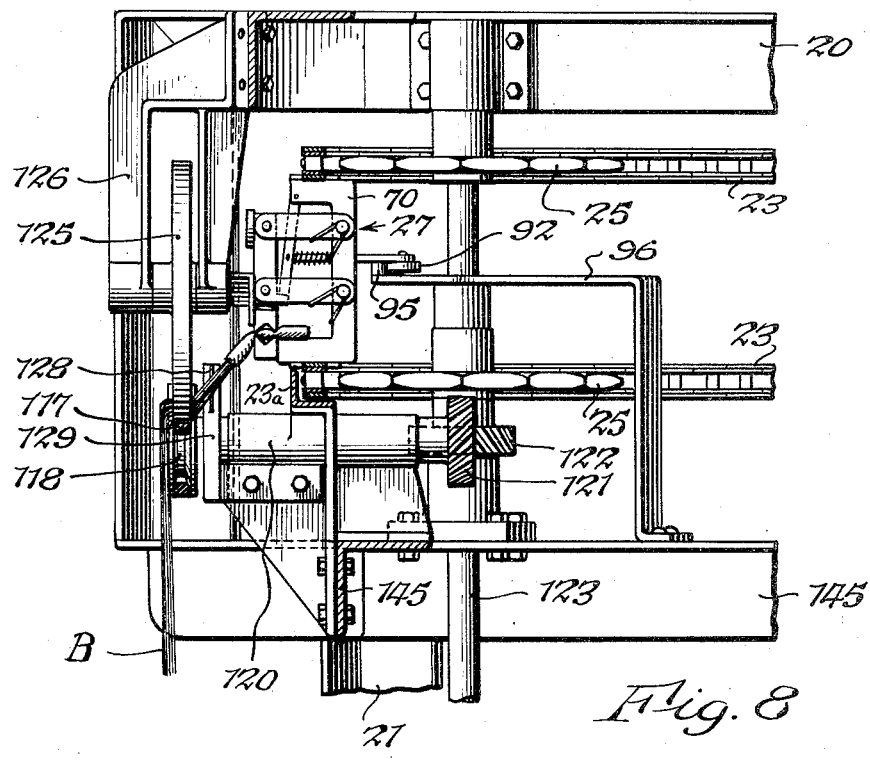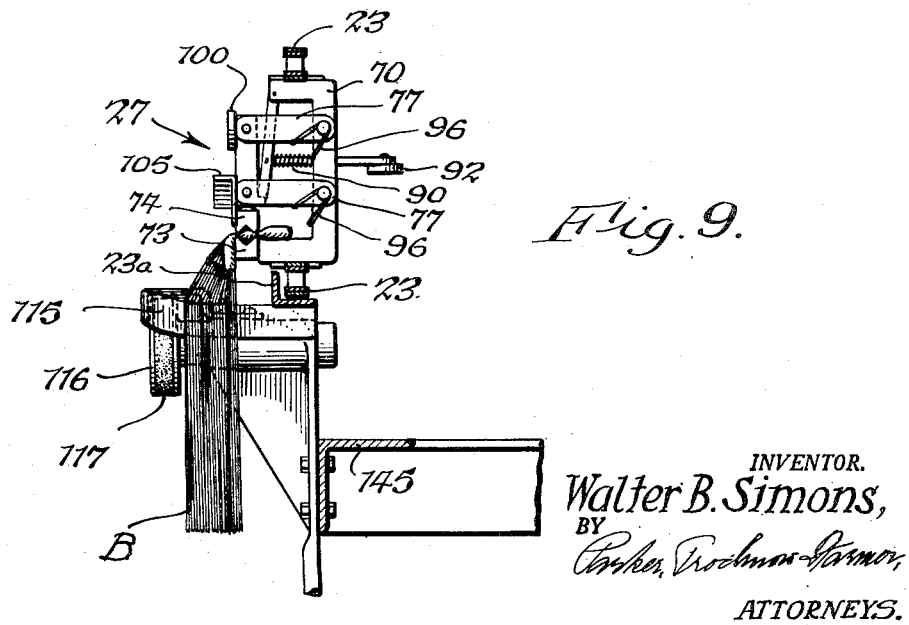

INVENTOR.
Walter B. Simons,
BY
ATTORNEYS.

Aug. 21, 1956  W. B. SIMONS  2,759,224
APPARATUS FOR EXTRACTING FIBERS FROM FIBER-BEARING PLANTS
Filed June 21, 1950  12 Sheets-Sheet 11
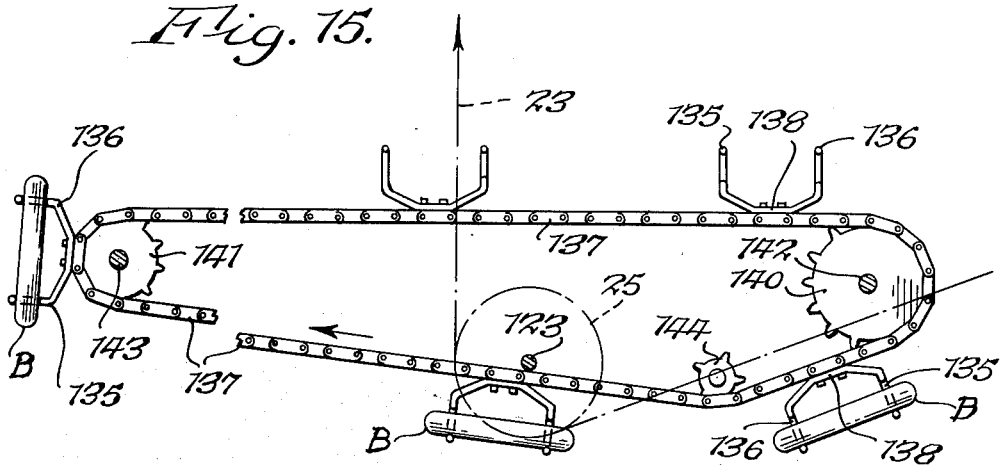
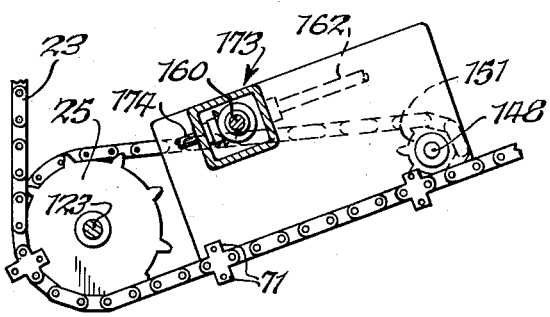
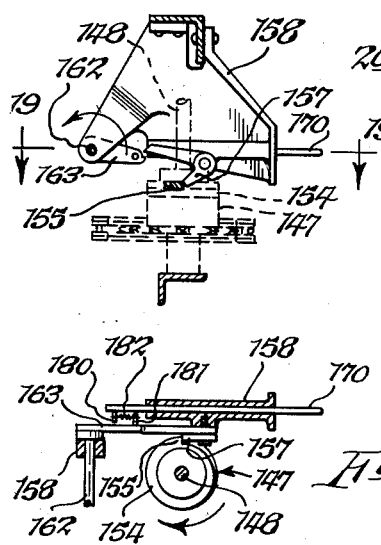
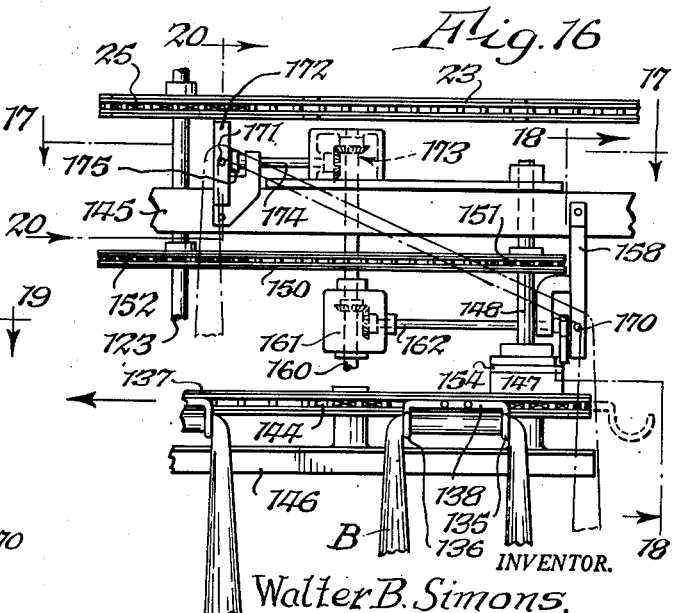
INVENTOR.
Walter B. Simons,
BY
Parker, Cruchnow Farmer,
ATTORNEYS.

INVENTOR.
Walter B. Simons,
BY
Parker, Prochnow & Farmer,
ATTORNEYS.

2,759,224

APPARATUS FOR EXTRACTING FIBERS FROM FIBER-BEARING PLANTS

Walter B. Simons, Buffalo, N. Y., assignor to W. B. Simons Industries, Inc., Wilmington, Del., a corporation of Delaware Application June 21, 1950, Serial No. 169,348

22 Claims. (Cl. 19—11)

This invention relates to improvements in decorticating or extracting plant fibers from various plant parts.

In the extraction of fibers, it is very important that the fibers be cleaned to the maximum extent in the decorticating machine so that the final cleaning thereof by chemical processes is reduced to the minimum for the purpose of reducing the cost of producing the fibers and also to avoid weakening of the fibers by chemical action.

One object of this invention is to provide an improved fiber extracting machine and a method by means of which the fibers are more rapidly and thoroughly cleaned.

Another object is to provide an improved machine and method in which the handling of the fibers and the plant parts from which they are derived is reduced to a minimum.

Another object is to provide a fiber extracting machine of this type which may be arranged in operative relation to a harvester or cutting machine which cuts the fiber bearing plants and supplies them to the fiber extracting machine.

A further object is to provide a machine of this type in which the loss of fibers is reduced to a minimum.

In my earlier Patent No. 1,741,543 of December 31, 1929, a decorticating machine is shown comprising a rasping roll and a stationary plate, and in which the plant parts to be decorticated were passed in the direction of their length first in one direction between the roll and the plate and then withdrawn in the opposite direction.

Another object of this invention is to provide a machine which is so constructed that the plant part passes only in one direction between the rasping drum and the plate while the fibers are being extracted, thus increasing the capacity 100 per cent.

A further object is to provide a machine of this type in which a converging entrance is provided between one end of the rasping drum or roll and the corresponding end of the plate, between which, the plant part to be treated may be inserted in a direction parallel to the axis of the rasping roll, and then withdrawn in a direction substantially perpendicular to said axis.

A further object is to provide a machine of this type in which the plant part is grasped adjacent to the butt end thereof and then fed into the space between the rasping roll and its cooperating plate in a direction parallel to the axis of the drum, and in which the plant parts are then withdrawn in the direction of their length between the rasping roll and plate so that the fiber extraction begins at the butt portion of the plant portion or stem and terminates at the tip of the plant part.

In all fiber bearing plants, the fibers are much more numerous in the butt portion of the leaf or stem, and the tip of the leaf or stem contains relatively few fibers. Consequently, when the stem or stalk is introduced between the rasping roll and its plate, the fibers adjacent the butt end of the stem will be cleaned to a much greater extent than the fibers near the top of the plant. The numerous fibers at the butt portion will be closely pressed together and will fill the space between the blades of the rasping roll and the plate, whereas, when the tip fibers pass between the roll and the plate, there will be ample space for the smaller number of fibers to pass between the roll and plate without a thorough cleaning of these fibers.

A further object of this invention, consequently, is to provide a method and a machine of this type in which the stalks or stems of the plants are so withdrawn from the machine that the fibers at the tip portions of the stems or stalks will be cleaned as thoroughly as the fibers of the butt portions.

Another object of this invention is to provide a machine of this type with means for automatically grasping the butt ends of the leaves or stems and conveying them into the space between the rasping roll and its plate, and then withdrawing the fibers from the rasping roll and plate and discharging them.

A further object is to provide a machine of this type which includes carrying means, such as sprocket chains carrying gripping or clamping devices for the plant parts, and in which the sprocket chains are guided to present the stems or leaves into operative relation to the rasping roll and plate and for withdrawing the cleaned fibers from the space between the rasping roll and plate.

A further object of this invention is to provide a machine of this type in which the fiber leaves or stems will pass through the space between the rasping roll and its plate only once, and in which the lower portion of the space between the rasping roll and its plate serves to loosen and remove most of the non-fibrous portions of the leaves or stems and the upper portion of the space between the roll and the plate through which the fibers pass after most of the non-fibrous material has been removed therefrom, will serve for cleaning remaining undesired plant parts and broken cell structure from the fibers.

A further object is to provide a rasping roll of new and improved construction for more thorough cleaning of the fibers.

A further object is to provide a machine of this type with improved means for cutting the extracted fibers from the butt portions of the stalks which are gripped in the gripping jaws of the machine.

A further object is to provide a machine of this type in which the gripping jaws, after cutting of the extracted fibers from the butt portions of the stalks or leaves, are opened and the butts removed therefrom.

A further object is to provide means for positioning the leaves or stems of plants relatively to the machine in such a manner that the butt portions thereof can be grasped by the gripping devices of the machine.

A further object is to provide a machine of this type in which the stems or leaves are gripped while in a substantially horizontal position and in which the stems or stalks are bent downwardly into substantially vertical positions in which they are suspended from the gripping members for feeding to the fiber extracting roll and plate.

Another object is to provide mechanism for collecting the extracted fibers after the same have been cleaned and cut from the butts of the stalks or leaves and for conveying the fibers into position in which they can be readily removed from the fiber conveyor.

A further object is to provide a machine in which the extracted fiber, after being cut from the butts, is deposited on the fiber conveyor in equal bundles, all fibers being parallel and butts even, which is an essential requirement for the subsequent process of degumming.

Other objects and advantages will be apparent from the following description of one embodiment of the invention and the novel features will be particularly pointed out hereinafter in connection with the appended claims.

In the accompanying drawings, which illustrate by way of example one embodiment of this invention:

Fig. 1 is a top plan view of a fiber extracting machine embodying this invention, the structure for feeding the plant parts to be acted upon being partly shown and the mechanism for conveying the extracted fiber from the machine being omitted from this figure.

Fig. 2 is an end elevation thereof, showing the feed end of the machine.

Fig. 3 is a side elevation of a machine, partly broken away and showing the mechanism for removing the fibers from the machine.

Fig. 4 is a fragmentary top plan view thereof, on an enlarged scale, on line 4—4, Fig. 3, showing the feed end of the machine at which the leaves or stems are gripped by the gripping members of the machine.

Fig. 5 is a fragmentary sectional top plan view thereof, on line 5—5, Fig. 3, showing the rasping roll and the plate cooperating therewith.

Fig. 6 is a fragmentary sectional elevation thereof approximately on line 6—6, Fig. 1.

Fig. 7 is a fragmentary, longitudinal sectional elevation thereof, on line 7—7, Fig. 1, showing the plant parts entering the space between the roll and plate.

Fig. 8 is a fragmentary sectional elevation of the machine, on line 8—8, Fig. 1, showing the mechanism for cutting the fibers from the stalks after the fibers have been extracted.

Fig. 9 is a similar fragmentary sectional elevation thereof, on line 9—9, Fig. 1.

Fig. 15 is a fragmentary sectional plan view of the fiber collecting and discharge mechanism of the machine, the section being taken on line 15—15, Fig. 3.

Fig. 16 is a side elevation of the fiber collecting and discharge mechanism.

Fig. 17 is a sectional plan view thereof, on line 17—17, Fig. 16.

Fig. 18 is a vertical section thereof, taken along line 18—18, Fig. 16.

Fig. 19 is a horizontal section thereof, on line 19—19, Fig. 18.

Fig. 23 is an enlarged perspective view of a knife supporting bracket and showing a knife mounted thereon, for cutting the extracted fibers from the butt ends of the stalks or leaves.

Fig. 24 is an enlarged perspective view of a post which limits the extent to which the fibers may move lengthwise of the extracting roll and plate.

Figure 10:
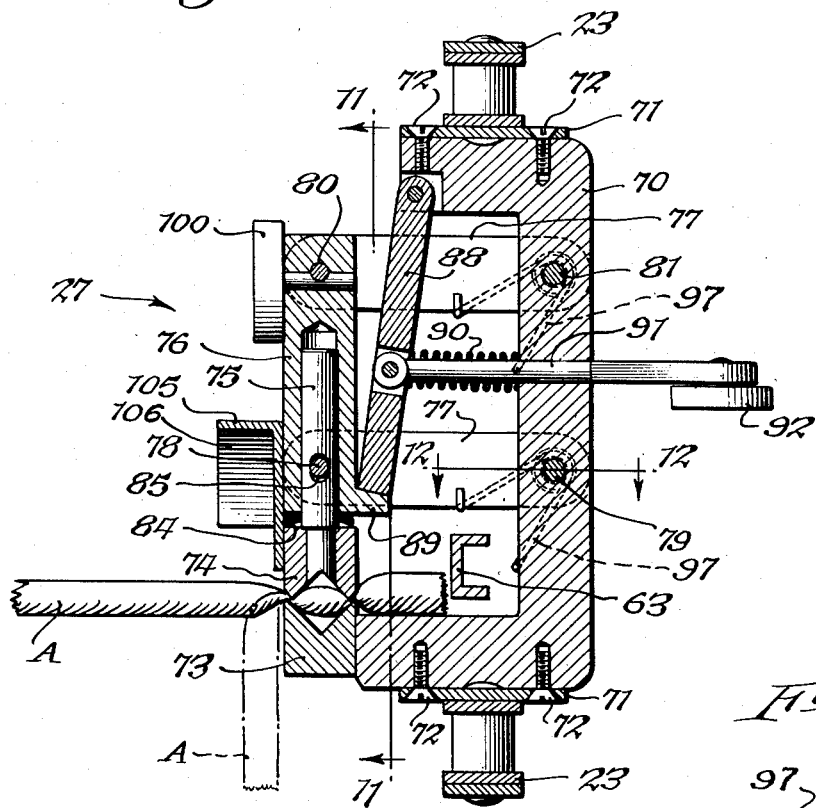
Fig. 10 is a central sectional elevation thereof, on a larger scale, of one of the gripping devices for holding the stalks or leaves from which fibers are to be extracted.
Figure 12:
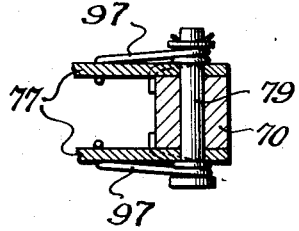
Fig. 12 is a fragmentary sectional plan view thereof, on line 12—12, Fig. 10.
Figure 11:
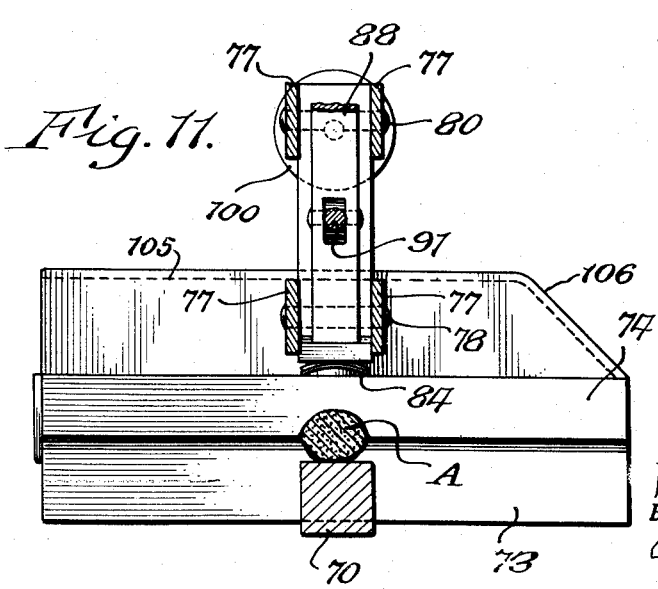
Fig. 11 is a sectional elevation thereof, on line 11—11, Fig. 10.

The machine includes a suitable frame of any desired construction, that shown including horizontal frame members 20 and upright members 21, suitably secured together and on which the various parts of the machine are mounted.

Briefly stated, the machine shown in the drawings includes a pair of sprocket chains 23 arranged one above the other and meshing with upper and lower pairs of sprocket gears 24, 25 and 26. The chains travel in a substantially triangular path and carry a plurality of gripping or clamping members 27 which receive the stalks or plant parts to be operated upon and feed them to a fiber extracting or rasping roll 28 which cooperates with a rasping plate 29 and withdraws the fibers from the space between the roll and plate. The two chains travel in substantially horizontal planes, one above the other, and the gripping members 27 receive the stalks or stems from feed belts 30 to which they are transferred from a harvester attached to the travelling fiber extracting machine. The butts of the stems are grasped by the gripping or clamping members 27 and are carried to the rasping roll 28. To support the weight of the gripping members and the plant parts carried thereby, chain guides 23a are provided, which support the lower chain 23.

It is very desirable to pass the stalks or stems into the space between the rasping roll and its plate in such a manner that the rasping or cleaning will begin in the immediate vicinity of the butt ends of stalks, and for this purpose, the decorticating or rasping roll 28 and the plate 29 are so formed or flared that the stalks or other plant parts may be fed between the roll and the plate while moving in a direction substantially parallel to the axis of the roll. For this purpose, the alternately arranged blades 32 and 33 of the roll are tapered or converge as shown at 34 and 34' respectively, see particularly Figs. 1 and 5, and the plate is also provided with an outwardly curved end portion 35, thus forming a bight or flaring entrance between the blades of the roll and the plate, into which entrance the portions of the plant parts adjacent to the butts may be introduced while moving substantially parallel to the axis of the roll. The flaring ends of the blades gradually reduce the stalk or plant part in thickness so that it will readily enter into the small clearance between the blades and the plate. The shaft or reduced ends of the roll 28 may be suitably journalled in bearings 37, Figs. 1, 5 and 7, on the frame of the machine and these bearings are movable by means of adjusting screws 38 to provide the desired clearance between the edges of the blades 32 and 33 and the rasping plate 29, and the bearings may be clamped in adjusted position by means of bolts 39.

After the butt portions of the stalks or stems have been inserted between the rasping roll and plate by moving the same in a direction parallel to the axis of the roll, they are pulled out of the space between the roll and plate in a direction transverse of the axis of the roll, due to the movement of the clamping devices with the chains around the sprocket gears 24 and toward the sprocket gears 25, as shown in Fig. 1. When the fibers have been completely pulled out of engagement with the decorticating or rasping roll and plate, they pass to cutting mechanism which cuts the extracted fibers from the butts held by the gripping devices. The fibers are then deposited on a fiber discharge mechanism which carries the fibers into a convenient location for removal from the machine. The gripping devices are subsequently opened and freed of the butts which are left after the extracted fibers have been cut therefrom, and then travel on to the conveyor belt 30 which carries freshly cut stalks to the machine, from which the gripping devices grasp another load of stalks. The gripping devices then pass with the chains around the sprocket gears 26 to the sprocket gears 24, where these stalks are passed between the roll 28 and plate 29, whereupon the extracting operation is repeated. Means other than sprocket chains may be used to carry the gripping devices in their path to the various parts of the machine.

Since the rasping roll is operated at a high rate of speed, for example, approximately 3000 R. P. M., it is sometimes difficult to move the stalks into the small fiber extracting spaces between the blades of the rasping roll and the plate 29. Therefore this entry of the stalks into the space is facilitated by providing some of the extracting blades with tapers 34 some of which are inclined to the axis of the roll to a greater extent than others. For example, in the construction shown, the blades 32 have a more gradual taper than the blades 33 and consequently, when the stalks enter into the bight between the blades and the rasping plate 29, the more abruptly inclined ends 34' of the blades 33 will engage the stalks before the less abruptly inclined ends of the blades 32. By employing different inclinations at the ends of the blades, no difficulty is experienced in causing the stalks to enter the small space between the blades and the plate. While I have provided alternate blades with entrance portions of different inclinations, it will be obvious that if desired every third or fourth blade may be provided with a more abrupt inclination than the remaining blades. As a result of this construction, and because of the V-shaped bight between the roll and the rasping plate the butt parts of the stalks or leaves of the fiber bearing plants adjacent to the gripping devices 27 may be readily passed in a direction substantially parallel to the axis of the roll into the small clearance between the edges of the blades of the roll 28 and the plate 29, which clearance may be on the order of approximately five thousandths of an inch. The inclined parts of the blades 32 and 33 remove some of the pulp and bark portions of the plant parts and reduce the thickness of the same so that they will more readily enter the small clearance between the main or straight portions of the blades and the plate where the main fiber extraction takes place.

Referring to the patent previously mentioned, in the mechanical fiber extracting operations as heretofore carried on, the upper or tip ends of the leaves or stems were fed downwardly into the space between the roll and the plate, and consequently, the waste pulp of the plant was deflected against the extracted fibers and adhered thereto. During the withdrawal of the fiber this broken and mashed cell structure adhering to the fibers was not completely removed. It is very hygroscopic, and after drying, again readily absorbs moisture from the air, thus favoring the development of mildew which rapidly destroys the luster, produces stains on the fibers and finally decreases their tensile strength. By means of the construction shown in the drawings, the waste pulp of the plants is also deflected downwardly, but since the extracted fibers are above the rolls, none of this waste material is deflected against the fibers.

Figure 22:
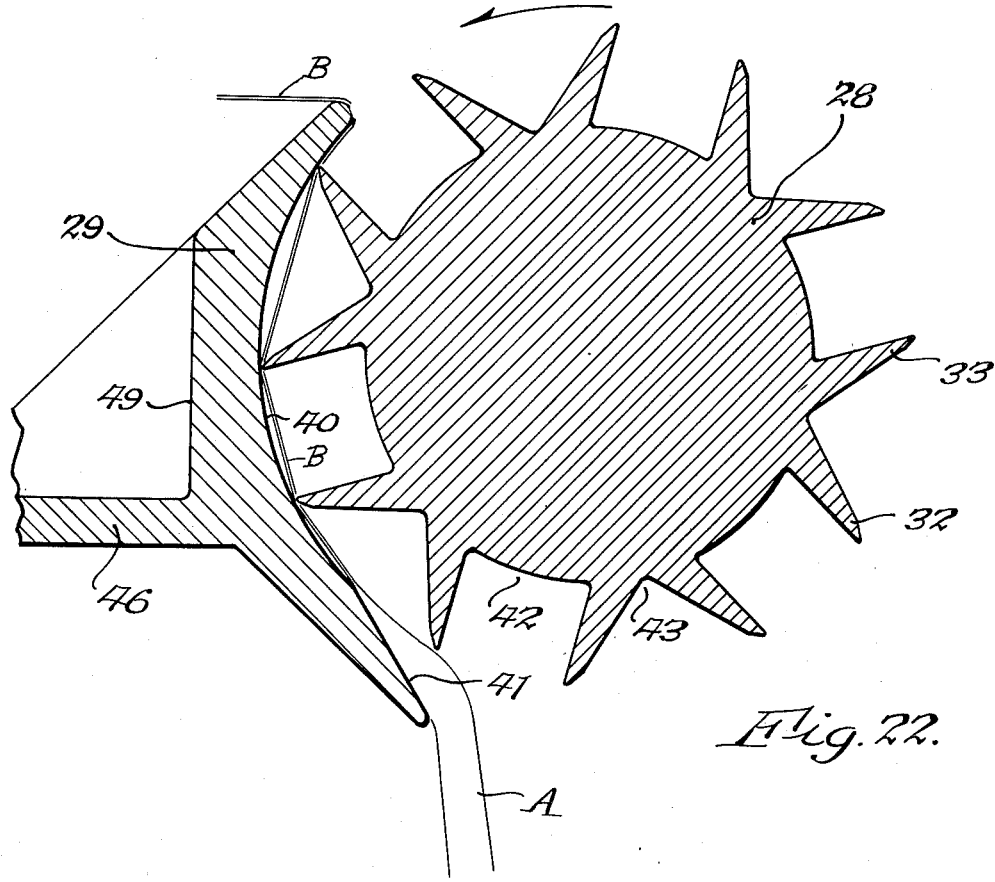
Fig. 22 is an enlarged cross section of the extracting roll and the plate cooperating therewith.

Further improved cleaning of the fibers results from the improved construction of the blades of the rasping roll and the rasping plate, which is shown more in detail in Figs. 7 and 22. Referring particularly to Fig. 22, it will be noted that as the stalks or leaves are moved upwardly in the space between the roll and the plate, due to the gripping members moving away from the plate 29 during their travel from the sprocket wheels 24 to the sprocket wheels 25, the removal of the pulp, bark and other waste material takes place at the lower portion of the plate 29 where the stalk or leaf parts enter the extracting space between the roll and plate. The rasping plate has the usual partly cylindrical surface 40 which is spaced in close proximity to the outer surfaces of the blades of the roll, and an outwardly extending or downwardly flaring part 41, the lower portion of which is spaced at a considerable distance from the blades of the roll, and this part 41 gradually merges into the cylindrical part 40, thus forming an easy entrance for the untreated plant parts as they are drawn upwardly into the space between the roll and plate. Most of the waste parts are separated from the plant fibers in the tapering entrance space defined by the plate part 41 and in the lowermost portion of the cylindrical part 40. Consequently, very little of the waste plant parts enter into the space between the roll and the cylindrical part 40 of the plate above the lowermost portion thereof. This space above the lowermost portion is, therefore, employed for further cleaning of the extracted fibers and removal of waste material therefrom by the brushing action of the blades of the rapidly revolving roll.

In the previously mentioned patent the extracting work began and continued at the upper edge of the extracting plate. In the present machine, the conditions are reversed. The work or application of power is at the lower edge of the extracting plate, extracting fiber against the strain of the gripping devices pulling the plant parts between the revolving blades and the plate portion 41. Thus the pull of the grip in one direction and the work of the extracting blades creating and maintaining a force in the opposite direction draws the extracted fibers B taut.

Therefore, the fibers traveling upward on the plate, under strain at both ends do not simply slide up in the space between the roll and the plate as in the previously mentioned patent, but instead the fibers are drawn tightly over the edges of the extracting blades. That is to say that each fiber assumes the form of several short cords of the arc of the plate. These cords are alternately of different lengths because alternate blades are difficult distances apart. Each fiber then tends to vibrate through the vertical distance between the center of the cord and the arc.

Inspection of Fig. 22 will also make it clear that, since the extracted fiber is withdrawn by the gripping devices with considerable tension over the upper edge of the plate 29, due to the force applied to the plant parts at the lower portion of this plate, this tension will tend to cause the fibers to stretch across the outer edges of the blades of the roll from blade to blade, thus becoming cords of the arc between adjacent blades. The portions of the fibers forming the cords change constantly due to the rapid travel of the blades. Consequently, it is evident that portions of the fibers will vibrate to and from the cylindrical surface to the plate many times per second as the various blades of the roll travel at high speed past the fibers.

The intense brushing of the fibers in the upper portion of the space between the roll and the plate in the machine shown in the drawings, after the fibers have been preliminarily separated from most of the pulp and outer skin of the plant in the lower portion of this space, results in a thorough cleaning of the individual fibers and expels the broken cell structure resulting from the fiber extraction and also a greater part of the plant juices, due to the tension of the fibers when passing through the upper part of this space. The heavier gums are thrown out either separately or as they adhere to cell structure which is removed during this cleaning operation.

The outer edges of the blades of the extracting roll, except as hereinafter specified, are all parallel to each other but the blades are preferably so arranged that the distances from one blade to two adjacent blades are not equal. The slant or inclination of adjacent blades from radial planes passing through the axis of the drum is different, every other blade, in the particular construction shown, extending at an inclination in one direction from such radial planes and the intermediate blades extending at an inclination in the opposite direction with reference to radial planes of the roll. This results in the formation of pockets or troughs in the roll which differ in volume. The blades act somewhat in the nature of fan blades and the direction of flow of air is different from alternate blades. The fibers are, consequently, subjected to blasts of air currents of varying pressures and directions at speeds upwards of sixty miles per hour resulting from the high speed at which the roll revolves, and these air currents produce a super-cleaning effect on the fibers vibrating in the space between the cylindrical portion of the plate and the edges of the blades. This air blast carries away most of the acids, moisture and broken cell structure and the gums which otherwise would have to be chemically removed from the fibers. The apparatus described, therefore, decreases the cost of subsequent treatment of the fibers to remove gums or particles of pulp or the like remaining on the extracted fibers. Furthermore, the fact that less chemical cleaning of the fibers is required, tends to preserve the tensile strength of the fibers B.

In plants from which fibers are commonly extracted, all the fibers of the particular leaf, stem, or stalk of the plant exist in the butt portion thereof and these fibers extend upwardly to different lengths, relatively few of the fibers extending to the tip of the plant part. In fiber extracting machines as heretofore constructed, the same space between the roll and the plate was used for extracting the fibers from all parts of the plant, and consequently, when operating at the butt portions of the leaves or stalks, this space would be well filled with fibers, but when the tip portion of the plant was operated upon in the same space, this space was very sparsely occupied by fibers and the result of this was that the fibers at the tip portions of the plants were very poorly cleaned because the pulp and other undesired parts of the plants were only partly removed from the tip portions. This difficulty is overcome in the construction shown in the drawings as is clearly illustrated in Fig. 1, in which it will be noted that as the gripping devices are moving about the sprocket gears 24, they initially present the stalks or leaves in succession to the space between the roll and the plate. As the gripping devices are moved by the chain from the sprocket wheels 24 toward the sprocket wheels 25, their component of travel in a direction lengthwise of the roll axis is materially reduced so that the fibers of a number of gripping devices become bunched together. Consequently, the fibers from the foremost gripping device have the fibers of the three following gripping devices closely spaced, and some of the fibers of one gripping device may actually overlap the fibers of another gripping device. This overlapping or shingling of the fibers of one gripping device with those of the following gripping devices, results in a substantially constant quantity of fibers being operated upon per unit of length of the space between the roll and the plate. Consequently, all of the fibers from all parts of the plant will be equally well cleaned.

The bunching or overlapping of the fibers of several gripping devices may be controlled by different means, such as variation of the distance between gripping devices, the number of stems or stalks held by each gripping device or by varying the angle between the run of the chains between pulleys 24 and 25 and pulleys 24 and 26. The bunching of the fibers of different gripping members may also be controlled by means of an adjustable upright post 45, see Figs. 1, 5 and 24, which is suitably mounted on a part of the frame and extends upwardly in proximity to and above the upper end of the extracting plate 29. This post has the further advantage of preventing any of the fibers from passing beyond the end of the roll 28 and thus becoming wound around the roll or shaft. The post may be adjusted lengthwise of the roll and plate in any suitable or desired manner. As shown in Fig. 7, the extracting plate 29 has a base 46 which may be mounted, for example, by means of bolts 48, on a transverse frame member 47. The extracting plate has an upwardly extending face 49 on the side thereof opposite to the cylindrical face and this face may be provided at intervals with threaded apertures to receive screws passing through apertures 50 in the post 45 so that the post may be adjusted lengthwise of the plate 29 as may be desired when operating on fibers of different types. Any other means for limiting the extent to which the fibers may move lengthwise of the plate 29 may be provided, if desired. The construction described has the further advantage that it entirely eliminates the possibility of fibers winding themselves about the roll, which has been a serious handicap with machines heretofore constructed. The possibility is further eliminated in the machine shown due to the fact that there are no fibers below the roll which can become caught by the revolving roll, since only plant parts from which fibers have not been extracted extend below the roll. The extracted and cleaned fibers are under tension by the gripping devices and are being continuously pulled away from the roll as soon as they are extracted and cleaned, and consequently, cannot become wound about the roll.

The stems after passing into the extracting space between the blades and the plate will provide a substantially constant amount of fiber in the portion of the extracting space adjacent to the entrance to this space. This portion of the extracting space between the roll and the plate adjacent to the entrance is filled with fiber which exists in the butts of the leaves or stems. As the extraction of the fibers proceeds and the plant parts are pulled through this space, the amount of fiber in the space will be reduced as the gripping devices move farther away from the extracting roll and plate, due to the fact that the intermediate and tip portions of the plant parts contain fewer fibers than the butt portions thereof. For example, if the gripping devices 27 are spaced twelve inches apart on the carrier chain, then when the fibers of the first gripping device which enter into the extracting space have moved about twelve inches away from the roll, the fibers of the following gripping device are partly superimposed on the fibers held by the first gripping device, or, crowd the fibers of the first gripping device toward or against the stop 45. When the first gripping device is 24 inches from the plate 29, the fibers from the third gripping device are also either superimposed or pushed against the fiber of both the first and second gripping device, and it is then possible that there may be too much fiber in the extracting space adjacent to the post 45. Similarly if long-fibered plant parts, such for example, as ramie, are being operated upon, the fibers of four different gripping devices may be in the extracting space between the roll and the plate, and there is, consequently, the possibility that some of the fibers will be rasped or scraped excessively, even though the fibers from the first gripping device will be somewhat reduced in bulk, because only the few fibers in the tip of the first group of stems are in the extracting space.

In order to overcome the possibility of damaging the fibers adjacent to the post 45, I preferably provide a slightly increased clearance between the ends of the blades of the roll and the plate at the portion of the roll at which the fibers from a number of gripping devices will become superimposed or pushed against each other. This may be accomplished by having the outer edges of the blades of the roll converge slightly from approximately the middle portion of the roll to the end thereof opposite to the end at which the fibers enter. This tapering of the outer edges of the blades of the roll may, of course, vary according to the particular type of plant on which the machine is operating and under average conditions, the edges of the blades, from approximately the middle portion of the roll, may taper to the extent of about .020 inch per foot. The amount of this increased extracting space which is occupied by fibers may be controlled as required by adjusting the stop post 45 lengthwise of the extracting plate 29. By means of this arrangement, the plant parts are subjected to the maximum cleaning without danger of excessive rasping or cutting the fibers.

Figure 13:
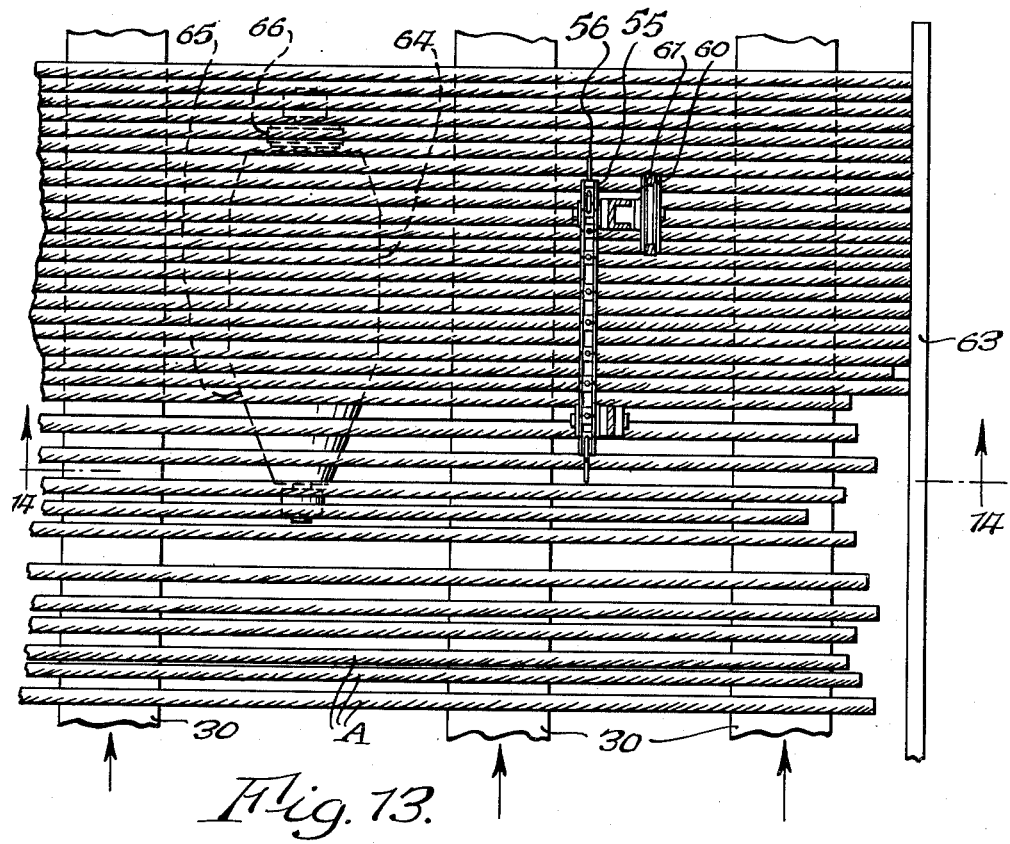
Fig. 13 is a fragmentary top plan view of the mechanism for conveying the plant parts, butts even, to the receiving portion of the machine, the grips.
Figure 14:
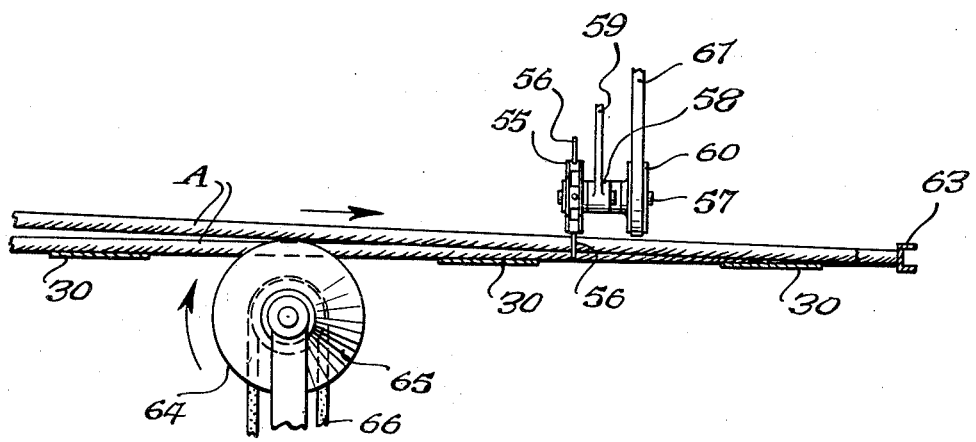
Fig. 14 is a fragmentary sectional elevation thereof, on line 14—14, Fig. 13, showing how the stems are shoved against the butt bar 63.

The stalks, leaves or other plant parts A from which fibers B, Fig. 22, are to be extracted may be fed in any suitable manner to the end of the machine which is at the left in Fig. 1, and this feeding of the stalks is illustrated by way of example in Figs. 13 and 14, in which the plant parts A are fed from a cutting or harvesting machine upon the belts 30. These plant parts as shown in the lower part of Fig. 13 arrive at the fiber extracting machine more or less irregularly spaced as they are cut from the plants in the field. In order to have each of the gripping devices grasp a substantially equal number of stalks it is desirable to place the stalks closely together and also with their butt ends in alinement. For this purpose, a sprocket chain 55 is provided and teeth or projections 56 thereon. The chain cooperates with sprocket wheels supported on shafts 57 mounted in bearings 58 at the lower ends of frame members 59 suitably secured at their upper ends to the frame of the decorticating machine and one of the shafts 57 is provided with a pulley 60 cooperating with a belt 61 suitably driven from a rotating part of the machine. The chain is supported immediately above the stalks or plant parts to be operated upon and is driven at a speed slightly greater than the speed of the belts 30. The teeth 56 engage the stalks and advance them so that all of the stalks will lie closely together as shown in the upper portion of Fig. 13. The teeth 56 of the chains advance the stalks until they engage a stop 62, Fig. 2. Any other means for moving the stalks closely together may be provided, if desired.

In order to move the stalks or other plant parts in the direction of their length so that the butt ends thereof will be in alinement, a stop member 63, Figs. 1, 4, 13 and 14, is provided against which the butt ends of the stalks may be positioned. This positioning or lengthwise movement of the stalks is effected by means of a roll mounted below the stalks which are carried on the conveyor belts 30. This positioning roll includes a substantially cylindrical surface 64, Fig. 13, terminating in a tapering or approximately frusto-conical surface 65 which converges in the direction opposite to the travel of the belts 30. The positioning roll is located so that the upper surface thereof is slightly above the conveyor belts 30, as shown in Fig. 14. Consequently, the belts and the pins 56 of the chain 55 move the stalks up the inclined portion 65 of the roll onto the substantially cylindrical portion 64 thereof, thus lifting portions of the stalks slightly above the upper surfaces of the belts 30. The roll is rotated in the direction indicated by the arrow in Fig. 14 in any suitable manner, for example, by means of a belt 66 driven from a part of the machine. As the stalks A are lifted upon the cylindrical portion of the roll they are also moved by the roll in the direction indicated by the arrow in Fig. 14 until they abut the stop member 63. Consequently, when the stalks are moved closely together and with their butt ends in alinement, they are ready to be grasped by the gripping devices. Any other means for alining the butts of the stalks may be provided.

The gripping devices may be of any desired construction, for example as shown in Figs. 8 to 12. Each gripping device includes a C-shaped frame member 70, the upper and lower ends of which may be suitably secured to the upper and lower chains 23 in any desired manner. In the construction illustrated, the chains are provided with links having enlarged portions 71 adjacent the pivots thereof and these enlarged portions may be secured to the upper and lower parts of the frame members 70 in any desired manner, for example, by means of screws 72, Fig. 10. The lower leg of the C-shaped frame member 70 of each gripping member has a gripping jaw 73 rigidly secured thereto, the upper surface of which is provided with any suitable surface for gripping the plant parts to be operated upon, and which is formed to cooperate with an upper jaw member 74 movably mounted on the frame member 70. In the construction shown for this purpose, the upper jaw member 74 is mounted on the lower end of a plunger 75 slidable vertically in an aperture formed in a jaw supporting member 76. This supporting member is movably mounted on the C-shaped frame member 70 of the gripping device to move toward and from the lower jaw, for example, by means of two pairs of parallel links 77. One of the ends of the lower pair of links 77 are pivoted to the supporting member 76 by means of pivot pins 78 and the other ends of these links are connected with the frame member 70 by means of a pivot 79. Similarly the upper pair of links 77 are connected by means of pivots 80 and 81 respectively with the supporting member 76 and the frame member 70. By means of this mounting, the supporting member 76 is movable vertically relatively to the frame members 70 and the lower jaw 73.

Suitable spring means, such for example as a pair of spring disks or leaves 84 are provided between the lower end of the supporting member 76 and the upper jaw 74 and the plunger 75 is mounted so as to move relatively to its supporting member 76, being for this purpose provided with a slot 85 through which the pivot member 78 extends, as clearly shown in Fig. 10. This pivot pin 78, consequently, holds the plunger 75 against rotation so as to keep the upper jaw 74 in alinement with the lower jaw 73.

Suitable locking means are provided for holding the upper jaw member in its lower or closed position when the plant parts A are between the jaws, and in the construction shown for this purpose, a dog or latch member 88 is pivotally mounted at its upper end on the C-shaped frame member 70 and has its lower end positioned to engage a step or projection 89 extending outwardly from the supporting member 76. The dog or latch 88 is yieldingly held in its lower or gripping position by means of a spring 90, that shown being in the form of a coil spring extending about a rod 91 pivotally connected at one end thereof with the dog or latch 88 and extending out through an aperture in the frame member 70. This rod is provided at the outer end thereof with a disk or wheel 92. When the parts are in gripping position, as shown in Fig. 10, the dog or latch 88 is in engagement with the step 89 of the supporting member 76, and the upper jaw 74 is thus yieldingly pressed toward the lower jaw and into engagement with the plant parts A by means of the springs 84 which are interposed between the supporting members 76 and the upper jaw 74. These springs 84 compensate for variations in thickness of the fibers in the plant parts to be grasped by the gripping device, and compensate for wear and the yielding hold avoids that excessive pressure which could crush or sever the fibers.

After the extracted and cleaned fibers have been withdrawn from the extracting roll and plate and cut from the butt portions of the stalks held by the gripping devices, as will be hereinafter explained, the upper jaw is moved up out of engagement with the butts of the stalks and this is effected by means of a cam member 95 mounted on an arm 96, see Fig. 4, and secured to a frame member of the machine. This cam 95 has an inclined face arranged in the path of movement of the roller 92 so that as the roller rides on the inclined face of the cam 95 during the movement of the clamping device, it is drawn to the right from the position shown in Fig. 10. This results in a corresponding movement of the rod 91, which in turn moves the latch 88 out of engagement with the projection 89 of the supporting member 76. When this happens, the links 77 are swung upwardly by suitable springs 97, see particularly Fig. 12, which are coiled about the pivots 79 and 81. One end of each spring engages the frame member 70 and the other end engages a link 77. These springs 97 urge the links 77 to swing about their pivots 79 and 81 and thus move the supporting member 76 and upper jaw member 74 upwardly to release the butts of the stalks held thereby. Upon further movement of the gripping members around the sprocket wheels 25, as shown in Fig. 4, the upper and lower jaws pass respectively above and below a stationary butt removing member or projection 98 suitably secured to one of the frame members of the machine. Consequently, as the jaws of the gripping member move relatively to the butt removing member 98, the butts of the stalks are removed from between the jaws and are permitted to fall upon the ground over which the machine is moving.

Referring again to Fig. 4, it will be noted that upon further travel of the gripping members about the sprocket wheels 25, the jaws of the gripping members will pass above and below the stop member 63 against which the butts of the stalks are moved by the stalk moving roll which has been described. Upon further movement of the chains 23, the gripping member will approach the portion of the stalk feeding mechanism in which the stalks are pushed closely together by means of the fingers 56 on the chain 55, Fig. 13, against the stop 62, Fig. 2. When a gripping device arrives at this point, its upper jaw is again moved downwardly into position to grip a series of plant parts A.

This gripping of the butt portions of the stalks or plant parts is effected by means of a wheel or disk 100 rotatably mounted on the supporting member 76 and positioned to cooperate with a cam or inclined portion 101 mounted on a bracket 102 secured to the frame of the machine, see particularly Figs. 2 and 10. As the roller 100 contacts with the inclined portion 101, the jaw supporting member 76 together with the upper jaw 74 of the gripping member will be moved downwardly into gripping engagement with a series of stalks or leaves temporarily held against movement with the belts 30 by means of the stop 62. While the supporting member 76 holds the upper jaw in compressed position in engagement with the series of plant parts A, the spring 90 urges the dog or latch 88 into engagement with the upper jaw supporting member 76 so that the upper jaw will be held in gripping position for carrying the plant parts A.

Means are also provided for automatically moving the stop member 62, which holds the stalks or plant parts against movement with the belts 30, into stalk releasing position. In the construction shown for this purpose, the stop member 62 is mounted on one end of a curved spring 104, the other end being secured to the bracket 102. The supporting member 76 of the upper jaw is provided at the outer side thereof with a cam member 105 which, in the construction shown, is of angle-shaped cross section and has a downwardly and forwardly inclined portion 106. As soon as the upper jaw is lowered into stalk gripping position, this inclined part 106 will engage a roller 107 mounted on the stop member 62, thus raising the roller and stop member 62. The inclined part 106 of the cam member terminates in a substantially horizontal part on which the roller 107 may roll while holding the stop member 62 out of its operative position, and as soon as this roller reaches the end of the horizontal part of a cam member of a gripping device, the spring 104 will move the stop member 62 back into position to stop stalks which are being fed by the belts 30, until they in turn are grasped by the next gripping device.

The stalks or plant parts to be operated upon by the machine are supported substantially horizontally on the belts 30 and, in order to pass them into the V-shaped bight between the decorticating roll 28 and its plate 29, the plant parts must be bent or swung downwardly. This may be accomplished in any suitable manner, and in the construction shown by way of example, a cam plate or strip 110, Fig. 2, is provided, one end of which may be secured to the bracket or frame part 102 and the other end of which may be secured to another bracket 111, also secured to the frame of the machine. The cam plate 110 is so shaped as to engage the stalks or stems after they leave the feed belts 30 and deflect them downwardly about the lower jaw, for example, from the full line position shown in Fig. 10, to the broken line position. The portions of the stalks to be presented to the fiber extracting roll and plate will, consequently, hang downwardly from the lower jaws of the gripping devices during the movement of the gripping devices from the sprocket wheels 26 to or beyond the sprocket wheels 24. As has been stated, upon passing around the sprocket wheel 24, the portions of the stalks or plant parts adjacent the lower jaws of the gripping devices will be fed into the bight between the roll 28 and plate 29, so that the fiber extraction will start adjacent the butts of the plant parts and as the gripping devices advance from sprocket wheels 24 to sprocket wheels 25, the fibers will be pulled through the space between roll 28 and plate 29 until the fibers are completely out of this space, whereupon the extracted fibers will drop downwardly by gravity into substantially vertical positions and they are then conducted by the further advance of the gripping devices to a discharge carrier upon which they are deposited for removal from the machine after the fibers are cut from the butt portions held by the gripping devices.

Any suitable or desired means may be provided for cutting the fibers from the butt portions thereof. Since the fibers of certain plants, such for example as ramie, are quite tough and gummy and very difficult to cut while wet, I have provided a cutting mechanism which greatly facilitates the cutting operation. I have found that if the fibers are under tension, they can be readily cut by a sharp cutting edge. Any suitable or desired means may be provided for applying tension to the fibers adjacent the butt portions held in the gripping devices, and in the construction shown, see particularly Figs. 8 and 9, I provide a stationary fiber guide or deflecting member 115, Figs. 1, 3 and 4, which may be suitably secured on the frame of the machine and which extends outwardly at an angle to the direction of movement of the gripping devices which support the fibers, in such a manner as to engage the fibers at a slight distance below the gripping devices and deflect the same outwardly therefrom. This deflecting or guide member 115 may be of inverted U-shape in cross section, and the outer end thereof extends over a pulley 116 which is connected by means of a belt 117, Figs. 3 and 4, with another pulley 118. Consequently, as the gripping devices move along, the guide member 115 discharges the fibers on the belt 117. This belt and its pulleys are so arranged that the belt in its travel diverges from the path of movement of the gripping devices, for example, about ten degrees.

The belt 117 may be driven in any suitable or desired manner, and in the construction shown, the pulley 118 is rotatably mounted on a bearing bracket 120 secured on a part of the frame of the machine, see Figs. 1, and 3 and 4. The other end of the shaft of the pulley 118 is provided with a gear 121 which cooperates with a gear 122 secured on an upright shaft 123 on which the sprocket wheels 25 are also mounted.

The fibers may be held frictionally and under tension in contact with the belt 117 in any suitable manner, and in the construction shown, an idler wheel 125 is provided which engages the belt 117 and holds the fibers in contact therewith. This wheel 125 may be mounted on a suitable bearing bracket 126 secured to a part of the frame of the machine. This wheel 125 is also arranged in a plane substantially coinciding with the plane of the belt 117, which plane is at an angle to the path of travel of the gripping devices.

While the fibers are under tension, due to contact with the belt 117 and idler wheel 125, and due to the divergence of the travel of the belt and the gripping devices, they pass into engagement with a knife 128, Fig. 8, which may, for example, be a razor blade or the like mounted on a bracket 129 suitably secured on the frame of the machine, see also Fig. 23. This knife cuts the fibers adjacent the butt ends held by the gripping devices as the fibers move with the gripping devices and with the belt 117 and wheel 125. Any other means for placing the fibers under tension while being cut may be provided.

Means are also provided for collecting the extracted fibers when they are cut from the butt ends held in the gripping devices and for moving them into a position to be readily removed from the machine. Referring to Fig. 3, it will be noted that as the gripping devices pull the fibers out of the space between the extracting roll and plate, the fibers will drop down and hang downwardly from the gripping devices. At approximately the same time that the fibers drop downwardly after being released from the extracting roll and plate, they will come into engagement with a receiving bracket 135. This bracket is preferably one of a pair of brackets, the other bracket 136, being spaced somewhat ahead of the bracket 135. These pairs of brackets are arranged at intervals lengthwise of a sprocket chain 137 which is movable intermittently so that when one pair of brackets or arms holds a sufficient quantity of fibers, the chain is advanced to present another pair of fiber-receiving brackets or arms in position to receive the fibers cut from the butts held by the gripping devices. In Fig. 3, one of the gripping devices is in position in which the fibers are about to be cut from the butts held by the gripping devices, and these fibers are already draped over the arm or bracket 135. As the fibers are cut they will fall downwardly across the other bracket or arm 136, so that the fibers will be held by the brackets or arms in hanks, the opposite ends of which hang downwardly from the arms or brackets. These arms or brackets 135 and 136, in the particular construction shown, are formed in one piece with a connecting rod 138, which is secured to one of the links of the fiber conveying sprocket chain 137. Any desired number of sets of brackets or arms may be mounted on the sprocket chain 137.

The sprocket chain 137, as clearly shown in Figs. 15 and 16, cooperates with sprocket wheels 140 and 141 which may be suitably mounted on shafts 142 and 143 and the sprocket chain also engages with an idler sprocket wheel 144. The shafts may be suitably journalled in any suitable manner on a diagonally extending frame member 145 of the frame of the machine and an extension thereof 146.

In the construction shown, the shaft 142 and sprocket wheel 140 are driven for intermittently advancing the chain 137, and for this purpose, a one-revolution clutch 147 is provided, see Fig. 16. This clutch may be of any suitable or desired type, and since clutches of this type are readily available in the market, details of the same are not herein shown. This clutch receives power for rotating the shaft 142 from a shaft 148 suitably driven in any desired manner. For example in the construction illustrated, this shaft is driven by means of a sprocket chain 150, which meshes with a sprocket wheel 151 mounted on the shaft 148 and with another sprocket wheel 152 which may be mounted on the upright shaft 123 on which the sprocket wheels 25 of the main chains are secured.

The one-revolution clutch 137 may be timed in any suitable or desired manner so that the sprocket chain 137 will be advanced when a pair of fiber receiving arms have received the desired amount of fiber. In the particular construction illustrated, see particularly Figs. 18 and 19, the clutch 147 is provided with a disk or plate 154, which is provided with a tooth 155, which is movable, after completing a revolution, into engagement with an arm 157 of a bell crank lever pivoted on a suitable fixed bracket 158 secured to a frame member or part of the machine. If this bell crank lever is swung in a clockwise direction in Fig. 18, the arm or projection 157 thereof will be moved out of engagement with the projection 155 of the clutch member or disk 154 and will thus permit the part of the clutch connected with the shaft 142 to revolve until the projection 155 again engages the arm 157.

The swinging of the bell crank lever for disengaging the projection 155 of the clutch may be effected by any suitable timing mechanism driven by means of a shaft 160, Fig. 16, which may be geared to or otherwise suitably connected to a driven shaft of the machine, this connection not being shown in the drawings. The shaft 160 is connected by means of a pair of beveled gears contained in a housing 161 with a horizontal shaft 162, Figs. 16 and 17. The shaft 162 is provided with an arm 163, see particularly Figs. 18 and 19. This arm has a part formed to engage the bell crank lever of which the arm 157 forms a part. When the arm 163 swings upwardly in the direction indicated by the arrow in Fig. 18, it will be obvious that this arm will engage the bell crank lever and move the arm 157 of the bell crank lever upwardly out of engagement with the shoulder or projection 155, and thus permit the clutch to make a revolution. Immediately after actuating the bell crank lever, the arm 163, due to continued rotation of the shaft 162, moves out of engagement therewith and permits the same to drop into the position shown in Fig. 18, so that the arm 157 of the bell crank lever will engage the clutch projection 155, and thus stop rotation of the shaft 142. The parts of the mechanism are so proportioned that a single revolution of the shaft 142 will bring a pair of fiber supporting arms into fiber receiving position between the sprocket gear 140 and the idler 144. The other end of the fiber conveying sprocket chain may extend into any convenient location at the rear of the machine when the fibers may be removed manually from the arms 135 and 136.

Figure 20:
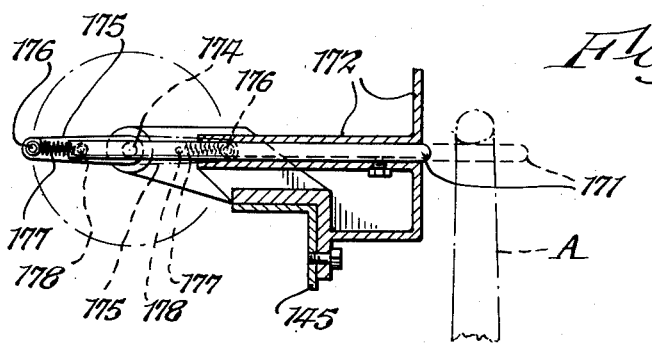
Fig. 20 is a section thereof, on line 20—20, Fig. 16, showing the means for temporarily receiving the extracted fibers discharged from the gripping members on the machine.
Figure 21:
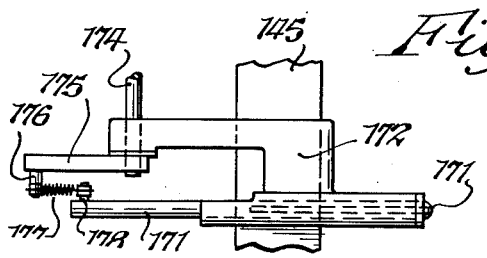
Fig. 21 is a top plan view of the construction shown in Fig. 20.

The cutting of fiber from the butts held by the gripping members is very apt to take place while one pair of fiber receiving arms is moved out of receiving position and another pair is moving into receiving position. In order to prevent loss of such fibers and to prevent them from being disarranged with reference to other fibers, I provide means for temporarily holding extracted fibers which are cut while one set of fiber receiving arms is being replaced by another set by rotation of the chain 137. In the construction shown for this purpose, I have provided a pair of temporary fiber-holding pins 170, Fig. 19, and 171, Fig. 20. The pin 170 is slidably mounted in the bracket 158 and the pin 171 is slidably mounted in another bracket 172 suitably secured on the frame member 145, Fig. 20, of the machine. Both of these pins are so mounted that they may be moved into outer positions in which they project into the path of the fiber and these pins may be withdrawn simultaneously to permit the fiber collected thereon to drop on a pair of arms 135 and 136. The movement of these pins into and out of their operative positions must be so timed that the pins are in their outer positions during the movement of the fiber-receiving arms on the chain 137 and withdrawn when the fiber-receiving arms 135 and 136 are in their fiber-receiving positions. This movement of the pins is preferably also controlled by means actuated by the timing shaft 160 which controls the one-revolution clutch 147. By way of example, the pin 171 may be actuated from the timing shaft 160 by means of a pair of bevel gears 173 connecting the shaft 160 with a horizontal shaft 174. The shaft 174, as shown in Figs. 16, 20 and 21 is provided with a crank 175 having an outwardly extending pin 176 to which one end of a coil spring 177 is connected. The other end of the spring is connected to a pin 178 secured to the fiber-receiving pin 171. It will be, consequently, seen that rotary movement of the crank 175 is converted into reciprocatory motion of the pin 171 by means of the spring 177. In Fig. 20, the position of the crank and spring shown in full lines indicates the position of the parts when the fiber holding pin 171 is withdrawn into a position in which the fibers thereon will be dropped from the pin 171 to the arms 135 and 136, and when the pin is in this inner position, the fibers cut from the butts held by the gripping devices will drop directly on the arms 135 and 136. As the crank 174 rotates, the spring 177 will stretch and when the crank is moved from the full line position shown in Fig. 20 into a position well beyond 90 degrees from that full line position, the spring will pull the pin 171 into its outer position indicated by the broken lines in Fig. 20.

The other pin 170 may be actuated by similar mechanism, and in Fig. 19, there is shown a pin 180 mounted on the fiber holding pin 170, another pin 181 is provided on the crank 163 and these two pins are connected by a coil spring 182. The operation of this mechanism is the same as that shown in Figs. 20 and 21. The actuating mechanisms for the fiber receiving pins 170 and 171 are correctly timed with reference to the mechanism for advancing the chain 137. Consequently, the fibers will be carried by the chain 137 into a position in rear of the machine where they can readily be removed by an attendant from the arms 135 and 136.

Power for operating the various parts of the machine may be provided in any suitable manner. In the construction shown, Fig. 3, an internal combustion engine 190 is provided which is mounted on the lower part of the frame of the machine and which is connected by means of a belt or belts 191 to the shaft of the fiber extracting roll 28. This shaft is preferably also provided at opposite ends thereof with flywheels 192 as shown in Fig. 1.

The engine through suitable gearing drives a horizontal shaft 194 extending along the base of the machine and this shaft in turn drives the upright shaft 123 on which the sprocket wheels 25 of the main chain 23 are secured and from which power is also taken for operating the belt 117 of the cutting mechanism as has been described. The timing shaft 160 may also be driven from the shaft 123 by any suitable or usual connection (not shown). Similarly the roll 64 and the chain 55 for presenting the plant parts in correct relation to the machine may be driven from the shaft 123.

In current operation the total field tonnage of stems is transported to a central extracting factory where a massive machine of many tons weight extracts about 4 per cent of the total vegetable weight in dry fiber. The other approximately 96 per cent of the weight must be returned and spread over the fields to eventually return the fertilizer elements to the soil in a form of compost. This two way freight lane amounts to approximately one half of the total cost of fiber extraction.

The fiber extracting apparatus herein explained is light and portable and travels about the field together with the cutting or reaping equipment like a grain combine and cuts the standing stems and delivers the extracted fiber at once and automatically spreads the plant refuse over the ground. Since the portable fiber extractor eliminates the two way haul, and the cost of that freight transportation is about one half the cost of fiber production, then it is evident that the portable fiber machine will reduce the cost of fibers extraction approximately 50 per cent.

It is also factual that the fiber fields must be not more than five miles from the central extraction plant for otherwise the freight lane cost makes fiber production unprofitable. My improved machine requires no central factory, expensive roads or transportation equipment and their upkeep.

In the central factory production operation, the fiber is commonly extracted by two extractor rolls each weighing approximately one-half ton. The blades of one five foot diameter roll strikes the plant part at about the center of its length and extracts the fiber toward one end of the plant part. The other roll begins operation at the center of the plant part and extracts the fibers in the untreated end. Thus the fibers are extracted by beginning at the middle of the stem or leaf and scraping away the pulp toward each end.

In all fiber producing plants the fibers grow from butt to tip and terminate at various distances along the length of the plant part culminating in only a few immature ends of fiber at the tip. Therefore, it is evident that about half of the fibers are half as long as the leaf or stem, and that these short fibers are in the butt half of the plant part.

Since the fiber extraction is begun at the center of the plant part by a scraping action toward the butt it is axiomatic that all the fibers half as long as the leaf are cast out with the pulp and skin or bark. This lost entangled fiber makes the loading and unloading and spreading of the waste in the field a difficult and expensive operation. My improved machine operates by scraping the pulp from the fibers beginning at the butt of the leaf or stem and progressing to the tip, which improved operational plan retains the short fibers discarded by all other existing machines. All of the fibers which are less than half as long as the stem are thrown away by prior machines, and these short fibers are saved by my improved machine.

Many fiber bearing plants have marginal thorns and a larger terminal thorn. The fibers terminate in these thorns. Such plant parts are not processed at present because the thorns entangle with the fibers and destroy them and the cost of removal is prohibitive. However, there is a great supply of many valuable fibers in these plants which abound in the tropics.

By means of the fiber extracting apparatus and process herein described, whereby the action of the extracting roll and plate begins near the butt portion of the plant parts, such thorns are discarded by the extracting roll at the lower portion of the space between the roll and the plate, and consequently, do not enter into this space, where they are apt to damage fibers which are being extracted. With my improved machine all this abundance of good fiber can be utilized.

In current machines the speed of the extracting blades over the fiber is more or less 3000 per minute.

My extracting roll may be operated at any desired speeds. For example, and especially so with ramie, if the roll is rotated at such speed that the blades of the roll travel over the fibers at approximately 50,000 per minute, so much of the undesired material is removed from the fibers that the fibers are of a much lighter color than has heretofore been possible to obtain by mechanism extraction. This indicates that not only is most of the pulp and other non-fibrous materials removed, but also most of the superficial acids and gums. This pre-cleaning of the fibers by rapid rotation of the roll does not weaken the fibers. Such light colored fibers are much easier to degum and require much less chemicals and time during subsequent degumming treatment. Consequently, stronger fibers are obtained.

This exceptional cleaning of the fibers by rapid rotation of the roll may be attributed to various causes. As has been stated and illustrated in Fig. 22, the fibers form cords when stretched across the edges of adjacent blades. At high roll speeds, the fibers of these cords vibrate similar to the strings of a musical instrument. Since alternate pairs of blades have their edges spaced at different distances, the vibrations will be different in alternate spaces between the blades. These rapid vibrations cause the fibers to shake off non-fibrous material attached thereto, and particles of such material which are not shaken off in one of these spaces will be shaken off when the fibers vibrate at a different rate in other spaces. These vibrating cords travel lengthwise of the fibers, superceding each other, so that each part of a fiber is intermittently vibrated at different high speeds. The vibrations fade out and change as each fiber part passes the edges of two blades. The efficiency of this vibrating action to free the individual fibers of adhering moisture, plant juices, and broken cell structure with gums clinging thereto is enhanced by virtue of the fibers traveling in succeeding vibrating cords and in opposite direction to the travel of the revolving blades. There is a progressive, successive cleaning of the same portion of the fiber as it travels upward in several different vibrating segments.

Due to the high speed of the roll, the blades produce rapidly flowing air currents which emerge partly at the ends of the roll. This airflow or blast, at high roll speeds may exceed 60 miles per hour and cooperates with the rapid vibration of the fibers to remove non-fibrous material therefrom. Furthermore, because of the different slant of adjacent blades and the resulting different capacities of the spaces between the blades, the air flow or blast will vary intermittently in quantity and intensity or rate of flow, and these variations of rate of flow also have an important cleaning action on the fibers. The different slant of adjacent blades, furthermore, changes intermittently the direction at which the air blasts strike the fibers. Consequently, the rapidly vibrating fibers are struck by blasts of air flowing in one direction in one pocket and in a different direction in the next pocket. This is repeated continuously while the fibers are in the space between the roll and the plate. Consequently, these air blasts cooperating with the vibration of the fibers results in a very thorough cleaning of the fibers.

It will be understood that it is not intended to limit the use of this apparatus and method to speeds at which the blades of the roll travel over the fibers, since very good cleaning can be effected at much lower rates of speed of the extracting roll. Even when the speed of the roll is less than half of that required to produce the maximum cleaning of the fibers, the fibers are more thoroughly cleaned than with any machine now known for this purpose. Exceptional results are obtained when the blades travel over the fibers at a rate in excess of about 25,000 times per minute.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. Apparatus for extracting fibers from fiber bearing plant parts, including a rotary extracting roll and a cooperating plate forming between them a space in which fibers are extracted from plant parts and formed to produce a flaring entrance to said space at one end of said roll and plate, a plurality of gripping devices which grip plant parts from which fibers are to be extracted, a sprocket chain on which said gripping devices are mounted and which is arranged in a substantially horizontal plane, means for deflecting the portions of the plant parts beyond said gripping devices downwardly, sprocket wheels about which said chain passes, one of said sprocket wheels being located adjacent to said flaring entrance, said carriers when passing around said last mentioned sprocket wheel moving said downwardly deflected portions of the plant parts adjacent to said carriers through said flaring entrance into said space, said gripping devices when passing from said last mentioned sprocket wheel to the next sprocket wheel moving said plant parts substantially in the direction of their length through said space for removing non-fibrous plant parts therefrom, and means for discharging the plant parts from said gripping devices when fibers of the plant parts held thereby have been drawn through said space in a direction substantially perpendicular to the axis of said roll.

2. Apparatus for extracting fibers from fiber bearing plant parts, including a rotary extracting roll and a cooperating plate forming between them a space in which fibers are extracted from plant parts, means for guiding said plant parts into said space, a plurality of gripping devices which grip plant parts from which fibers are to be extracted, an endless carrier on which said gripping devices are mounted and arranged in a substantially horizontal plane, said carrier including a portion which guides said gripping devices for movement in a direction to pass said plant parts to said means for guiding them in said space in a direction substantially parallel to the axis of rotation of said roll, said carrier having another portion extending away from said roll and plate to draw the plant parts held by said gripping devices through said space substantially in the direction of the length of said plant parts, said other portion of said endless carrier extending in a direction less than 90 degrees to the axis of said roll and along which said gripping devices move for drawing said plant parts through said space in the direction of said angle for moving fibers through said space mainly crosswise of the axis of rotation of said roll and to a slight extent lengthwise thereof in said space in a direction away from said guiding means.

3. Apparatus according to claim 2, in which said gripping devices include a fixed jaw and a movable jaw, a latch for holding said movable jaw in gripping position to hold plant parts between said jaws, and a stationary cam member positioned in the path of movement of said gripping devices after they have moved the fibers held thereby out of said space, for releasing said latch to cause said jaws to release said plant parts.

4. Apparatus for extracting fibers from fiber bearing plant parts, including a rotary extracting roll and a cooperating plate forming between them a space in which fibers are extracted from plant parts, means for guiding said plant parts in said space, a plurality of gripping devices which grip plant parts from which fibers are to be extracted, an endless carrier on which said gripping devices are mounted, said carrier including a portion which guides said gripping devices for movement in a direction to pass said plant parts to said means for guiding them in said space, said carrier having another portion extending away from said roll and plate to draw the plant parts held by said gripping devices through said space substantially in the direction of the length of said plant parts, a cutting member positioned adjacent to the path of movement of said gripping devices after the fibers held thereby have been drawn through said space for cutting the extracted fibers from the plant parts held by said gripping devices, means for opening said jaws after said fibers have been cut, means for removing remaining plant parts from said jaws, means for positioning plant parts to be operated on adjacent to the path of movement of said gripping devices with the ends of said plant parts positioned between said open jaws, and a cam member for closing said jaws to grip said untreated plant parts.

5. Apparatus according to claim 4 and including a latch member mounted on each gripping device for holding said jaws in closed position, and a cam on said apparatus located in the path of movement of said latch member after the gripping devices have passed said cutting member to withdraw said latch member from jaw holding position.

6. Apparatus for extracting fibers from fiber bearing plant parts, including a rotary extracting roll and a cooperating plate forming between them a space in which fibers are extracted from plant parts, means for guiding said plant parts in said space, a plurality of gripping devices which grip plant parts from which fibers are to be extracted, an endless carrier on which said gripping devices are mounted, said carrier including a portion which guides said gripping devices for movement in a direction to pass said plant parts to said means for guiding them in said space, said carrier having another portion extending away from said roll and plate to draw the plant parts held by said gripping devices through said space substantially in the direction of the length of said plant parts, a tension device for gripping fibers after they have been withdrawn from said space and applying tension to the fibers in a direction away from the plant parts held by said gripping devices, and a cutting blade for cutting the fibers after tension has been applied thereto.

7. Apparatus according to claim 6, in which said tensioning device includes a belt over which the portions of the fibers adjacent to said gripping device pass, and which is arranged at an angle diverging from the path of movement of said gripping devices, and an idler wheel cooperating with said belt for holding the fibers in engagement with said belt for applying tension to the fibers as they pass to the cutting blade.

8. Apparatus for extracting fibers from fiber bearing plant parts, including a plurality of gripping devices mounted to move in an endless path, a carrier for moving said gripping devices in said endless path, fiber extracting means in one portion of said path to which the plant parts are subjected while moving with said gripping devices, means at another portion of the path of movement of said gripping devices for carrying plant parts into position to be received by said gripping devices, said last mentioned means including a conveyor belt for carrying the plant parts to said other portion of said path of movement of said gripping devices, a stop member against which the butt ends of said plant parts are moved into position to be engaged by said gripping devices, means for actuating said gripping devices to grip plant parts which have been positioned against said stop member, a second stop for holding said plant parts against further movement by said conveyor belt for positioning the plant parts closely adjacent to each other, and mechanism for actuating said gripping devices for receiving plant parts adjacent to said second stop.

9. Apparatus according to claim 8 and including parts on said gripping devices for engaging said second stop when said gripping devices have gripped plant parts held by said second stop, and moving said stop member out of the path of movement of the plant parts held by said gripping devices.

10. Apparatus according to claim 8, and including parts on said gripping devices for engaging said second stop when said gripping devices have gripped plant parts held by said second stop, and moving said stop member out of the path of movement of the plant parts held by said gripping devices, and means acting on said plant parts while on said conveyor for moving the same toward said second stop at a faster rate of movement than that of said conveyor.

11. Apparatus for extracting fibers from fiber bearing plant parts, including a plurality of gripping devices mounted to move in an endless path, a carrier for moving said gripping devices in said endless path, fiber extracting means in one portion of said path to which the plant parts are subjected while moving with said gripping devices, a cutting member mounted adjacent to the path of movement of said gripping devices after the fibers of the plant parts held thereby have been drawn out of operative relation to said fiber extracting means, for cutting said fibers from the plant parts held by said gripping devices, and fiber collecting groups of arms upon which the extracted fibers are placed, an arm of one of said groups of arms being positioned in the path of movement of said fibers to said cutting device, and another arm of said group being positioned to receive fibers after they are cut from the plant parts held by said gripping devices.

12. Apparatus according to claim 11, and including means for moving said group of arms intermittently out of fiber receiving position and for positioning another group of arms in position to receive extracted fibers.

13. Apparatus for extracting fibers from fiber bearing plant parts, including a plurality of gripping devices mounted to move in an endless path, a carrier for moving said gripping devices in said endless path, fiber extracting means in one portion of said path to which the plant parts are subjected while moving with said gripping devices, a cutting member mounted adjacent to the path of movement of said gripping devices after the fibers of the plant parts held thereby have been drawn out of operative relation to said fiber extracting means, for cutting said fibers from the plant parts held by said gripping devices, fiber receiving parts upon which the extracted fibers drop when cut from said gripping devices, an endless chain on which a plurality of fiber receiving parts are mounted, and means for intermittently moving said chain for placing other fiber receiving parts into position to receive the cut fibers.

14. Apparatus for extracting fibers from fiber bearing plant parts, including a plurality of gripping devices mounted to move in an endless path, a carrier for moving said gripping devices in said endless path, fiber extracting means in one portion of said path to which the plant parts are subjected while moving with said gripping devices, a cutting member mounted adjacent to the path of movement of said gripping devices after the fibers of the plant parts held thereby have been drawn out of operative relation to said fiber extracting means, for cutting said fibers from the plant parts held by said gripping devices, fiber receivcing parts upon which the extracted fibers drop when cut from said gripping devices, an endless chain on which a plurality of fiber receiving parts are mounted, means for intermittently moving said chain for placing other fiber receiving parts into position to receive the cut fibers, temporary fiber supports movable into and out of position to receive cut fibers and support the same above said fiber receiving parts on said chain, and mechanism for moving said temporary supports into fiber receiving position during the movement of said chain, and for moving said supports out of operative positions after movement of the chain has been interrupted, to drop fibers held thereby on to said fiber receiving parts.

15. Apparatus for extracting fibers from fiber bearing plant parts including an extracting roll having outwardly projecting blades and a plate having a concave portion with a curvature approximately concentric with the axis of said roll and arranged in close proximity to the edges of the blades, forming a small space between said blades and said plate and means for drawing a plant part substantially in the direction of its length through said small space to remove undesirable plant parts from the fibers, the blades of said roll being tapered toward the axis of said roll at one end thereof to permit plant parts to be inserted into said space by moving the same in a direction substantially parallel to the axis of rotation of said roll, the taper of some of said blades being at a less acute angle to the axis of rotation of the extracting roll than the taper of other blades, to facilitate the insertion of untreated plant parts into said space.

16. Apparatus for extracting fibers from fiber bearing plants including a rotary rasping roll having a plurality of blades projecting outwardly with reference to the axis of rotation of said roll, a plate having a concave portion arranged in close proximity to the edges of said blades to form a space in which fiber extraction is effected, one end of said blades and plate diverging outwardly to form an entrance to said space into which untreated plant parts may be passed in a direction substantially parallel to the axis of rotation of said roll, a series of gripping devices for gripping the plant parts to be treated, and means for moving said gripping devices in an endless path, a portion of said path carrying said gripping devices in a direction substantially parallel to the axis of said roll into a position in which said plant parts to be treated are moved through said entrance into said fiber extracting space, and the next adjacent portion of said path guiding said gripping devices in a direction away from said roll and plate to draw the plant parts through said fiber extracting space in the direction of their lengths, said succeeding part of said path extending in a direction of less than 90 degrees to the axis of said roll for moving the fibers mainly in a direction at a right angle to the axis roll and to a lesser extent in a direction parallel to said axis, and a stop for limiting the extent to which fibers may be moved in said space in a direction parallel to said axis, whereby the fibers held by one gripping device are compacted against the fibers held by an adjacent gripping device.

17. Apparatus for extracting fibers from fiber bearing plant parts, including a rotary extracting roll and a cooperating plate forming between them a space in which fibers are extracted from plant parts and formed to produce a flaring entrance to said space at one end of said roll and plate, a plurality of gripping devices which grip plant parts from which fibers are to be extracted, an endless carrier on which said gripping devices are mounted, said carrier including a portion which guides said gripping devices for movement in a direction to enter said plant parts through said entrance to said extracting space, and another portion in which said gripping devices move away from said roll and plate to draw the plant parts held thereby through said extracting space substantially in the direction of the length of said plant parts, and a cutting member arranged in proximity to the path of movement of said gripping members for cutting the extracted fibers from the plant parts held by said gripping devices after said plant parts have been drawn through said extracting space.

18. Apparatus for extracting fibers from fiber bearing plant parts, including a rotary extracting roll and a cooperating plate forming between them a space in which fibers are extracted from plant parts and formed to produce a flaring entrance to said space at one end of said roll and plate, a plurality of gripping devices which grip plant parts from which fibers are to be extracted, an endless carrier on which said gripping devices are mounted, said carrier including a portion which guides said gripping devices for movement in a direction to enter said plant parts through said entrance to said extracting space, and another portion in which said gripping devices move away from said roll and plate to draw the plant parts held thereby through said extracting space substantially in the direction of the length of said plant parts, a cutting member arranged adjacent to the path of movement of said gripping members for cutting the extracted fibers from the plant parts held by said gripping devices after said plant parts have been drawn through said space, and means for actuating said gripping members for releasing the plant parts held thereby from said gripping members after cutting the extracted fibers therefrom.

19. Apparatus for extracting fibers from fiber bearing plant parts, including a rotary extracting roll and a cooperating plate forming between them a space in which fibers are extracted from plant parts, means for guiding said plant parts in said space, a plurality of gripping devices which grip plant parts from which fibers are to be extracted, an endless carrier on which said gripping devices are mounted, said carrier including a portion which guides said gripping devices for movement in a direction to pass said plant parts to said means for guiding them in said space, said carrier having another portion extending away from said roll and plate to draw the plant parts held by said gripping devices through said space substantially in the direction of the length of said plant parts, said gripping devices including a fixed jaw and a movable jaw, a latch for holding said movable jaw in gripping position to hold plant parts between said jaws, a cam member positioned in the path of movement of said gripping devices after they have moved the fibers held thereby out of said space, for releasing said latch to cause said jaws to release said plant parts, and a fixed part on said apparatus mounted to extend between said jaws after the gripping devices have moved past said cam member to remove said plant parts from said gripping devices.

20. Apparatus for extracting fibers from fiber bearing plants including a rotary rasping roll having a plurality of blades projecting outwardly with reference to the axis of rotation of said roll, a plate having a concave portion arranged in close proximity to the edegs of said blades to form a space in which fiber extraction is effected, one end of said blades and plate diverging outwardly to form an entrance to said space into which untreated plant parts may be passed in a direction substantially parallel to the axis of rotation of said roll, a series of gripping devices for gripping the plant parts to be treated, and means for moving said gripping devices in an endless path lying in a substantially horizontal plane, a portion of said path carrying said gripping devices into a position in which said plant parts to be treated are moved through said entrance into said fiber extracting space, and the next adjacent portion of said path guiding said gripping devices in a direction away from said roll and plate in a direction of less than 90 degrees to the axis of said roll for moving the fibers mainly in a direction at a right angle to the axis of said roll and to a lesser extent in a direction parallel to said axis away from said entrance, whereby the fibers of different gripping devices will overlap when said gripping devices pass through said next portion of said path of movement, the edge portions of the blades of said roll converging slightly from approximately the middle of said roll to the end thereof opposite to said entrance, to provide an increased space for said overlapping fibers, and a post adjustably mounted on said plate to limit the extent to which the fibers may move in said space in a direction parallel to the axis of said roll.

21. Apparatus for extracting fibers from fiber bearing plants including a rotary rasping roll having a plurality of blades projecting outwardly with reference to the axis of rotation of said roll, a plate having a concave portion arranged in close proximity to the edges of said blades to form a space in which fiber extraction is effected, one end of said blades and plate diverging outwardly to form an entrance to said space into which untreated plant parts may be passed in a direction substantially parallel to the axis of rotation of said roll, a series of gripping devices for gripping the butt ends of plant parts to be treated while said plant parts are in substantially horizontal positions, means for moving said gripping devices in an endless path, a cam plate past which said gripping devices move and which engages said plant parts while the same are in substantially horizontal positions and bends the portions thereof adjacent to said gripping devices downwardly to hang substantially downwardly from said gripping devices, and means for guiding said gripping devices to pass said downwardly extending plant parts adjacent to their bent ends into said diverging end of said blades and plate to enter said plant parts into said space while said gripping devices are moving substantially parallel to the axis of rotation of said roll, a portion of said guide means causing said gripping devices to move in the direction mainly away from said roll and plate to draw said plant parts through said space in the direction of their lengths.

22. Apparatus for extracting fibers from fiber bearing plant parts including an extracting roll having outwardly projecting blades and a plate having a concave portion with a curvature approximately concentric with the axis of said roll and arranged in close proximity to the edges of the blades, forming a small space between said blades and said plate through which a plant part may be drawn substantially in the direction of its length to remove undesirable plant parts from the fibers, the blades of said roll being tapered toward the axis of said roll at one end thereof to permit plant parts to be inserted into said space by moving the same in a direction substantially parallel to the axis of rotation of said roll, the taper of some of said blades being at a less acute angle to the axis of rotation of the extracting roll than the taper of other blades, to facilitate the insertion of untreated plant parts into said space.

References Cited in the file of this patent

UNITED STATES PATENTS

| | | |
|---|---|---|
| 899,846 | Scherr et al. | Sept. 29, 1908 |
| 915,125 | Summers | Mar. 16, 1909 |
| 1,258,571 | Humphreys | Mar. 5, 1918 |
| 2,282,715 | Faure | May 12, 1942 |
| 2,288,652 | Simons | July 7, 1942 |
| 2,341,290 | Reeves | Feb. 8, 1944 |
| 2,480,602 | Patterson | Aug. 30, 1949 |

FOREIGN PATENTS

| | | |
|---|---|---|
| 692,043 | Germany | June 11, 1940 |